Figure 1:
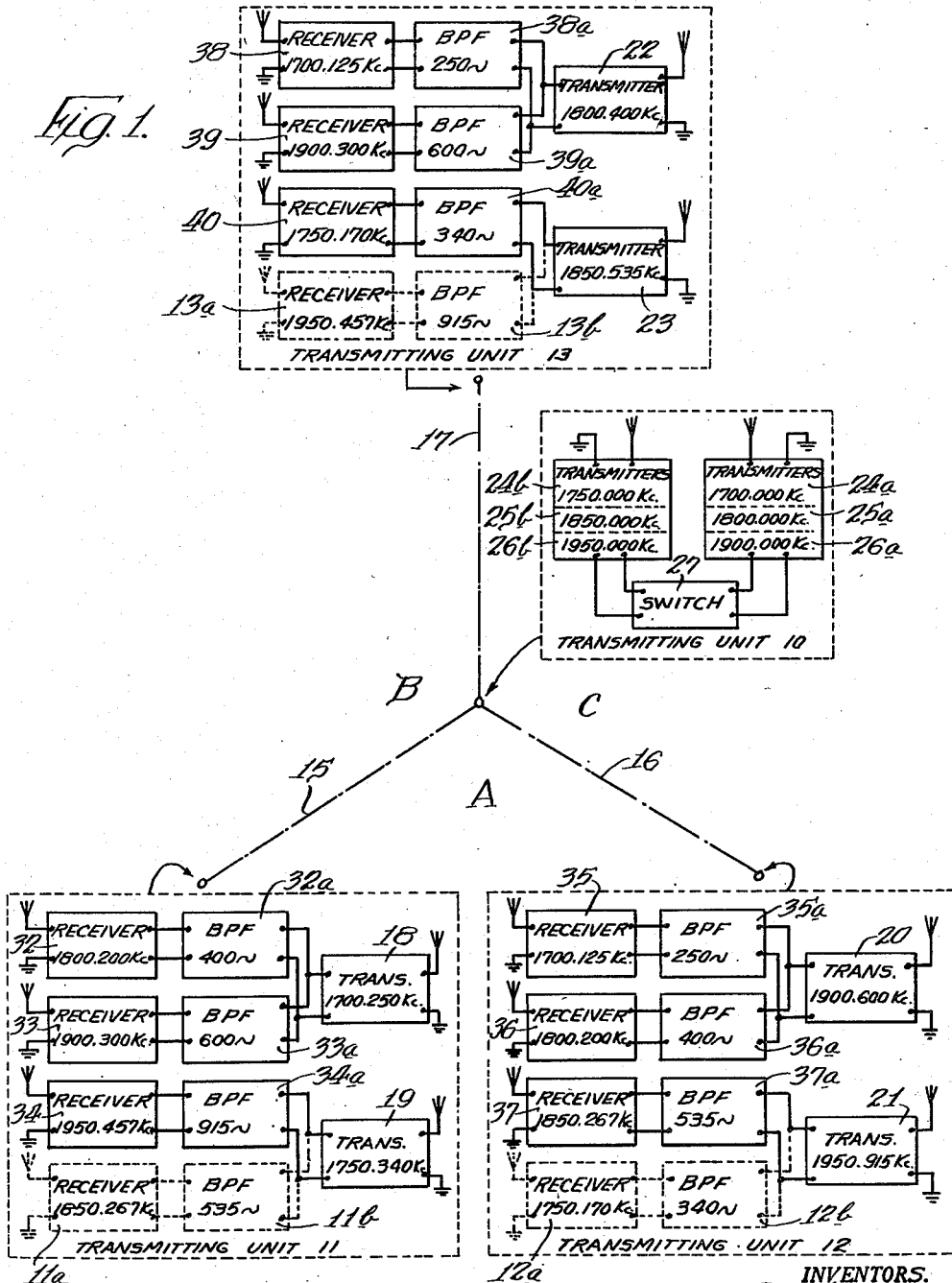

Jan. 21, 1958 J. E. HAWKINS ET AL 2,820,962
RADIO LOCATION SYSTEM
Filed April 23, 1954 4 Sheets-Sheet 1

INVENTORS.
James E. Hawkins
Edward J. Crossland
By: Mason, Kolehmainen, Rathburn & Wyss
Attys

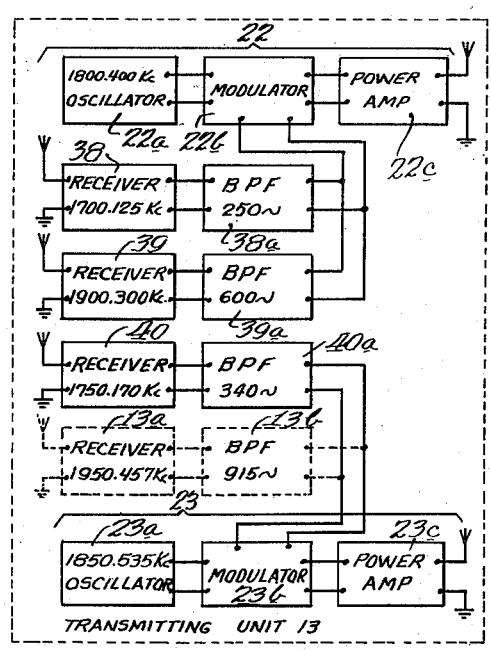
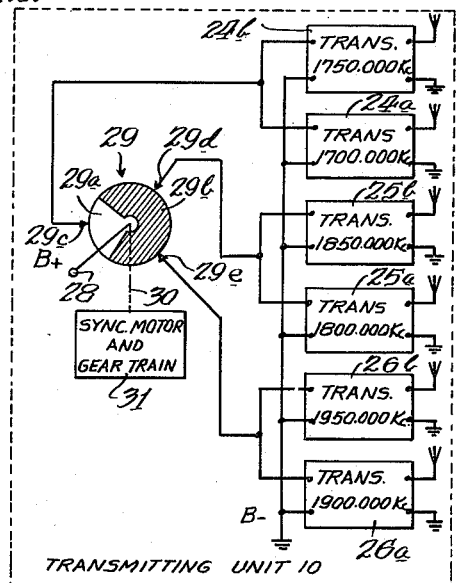
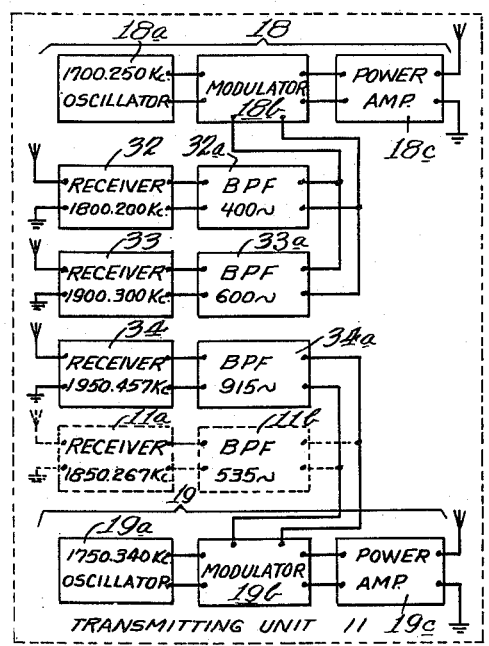
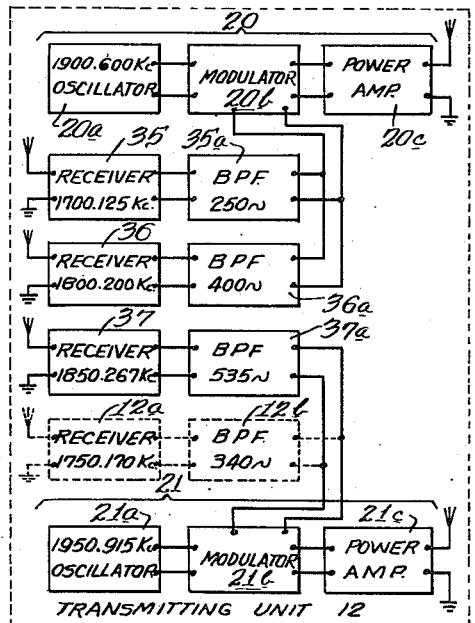

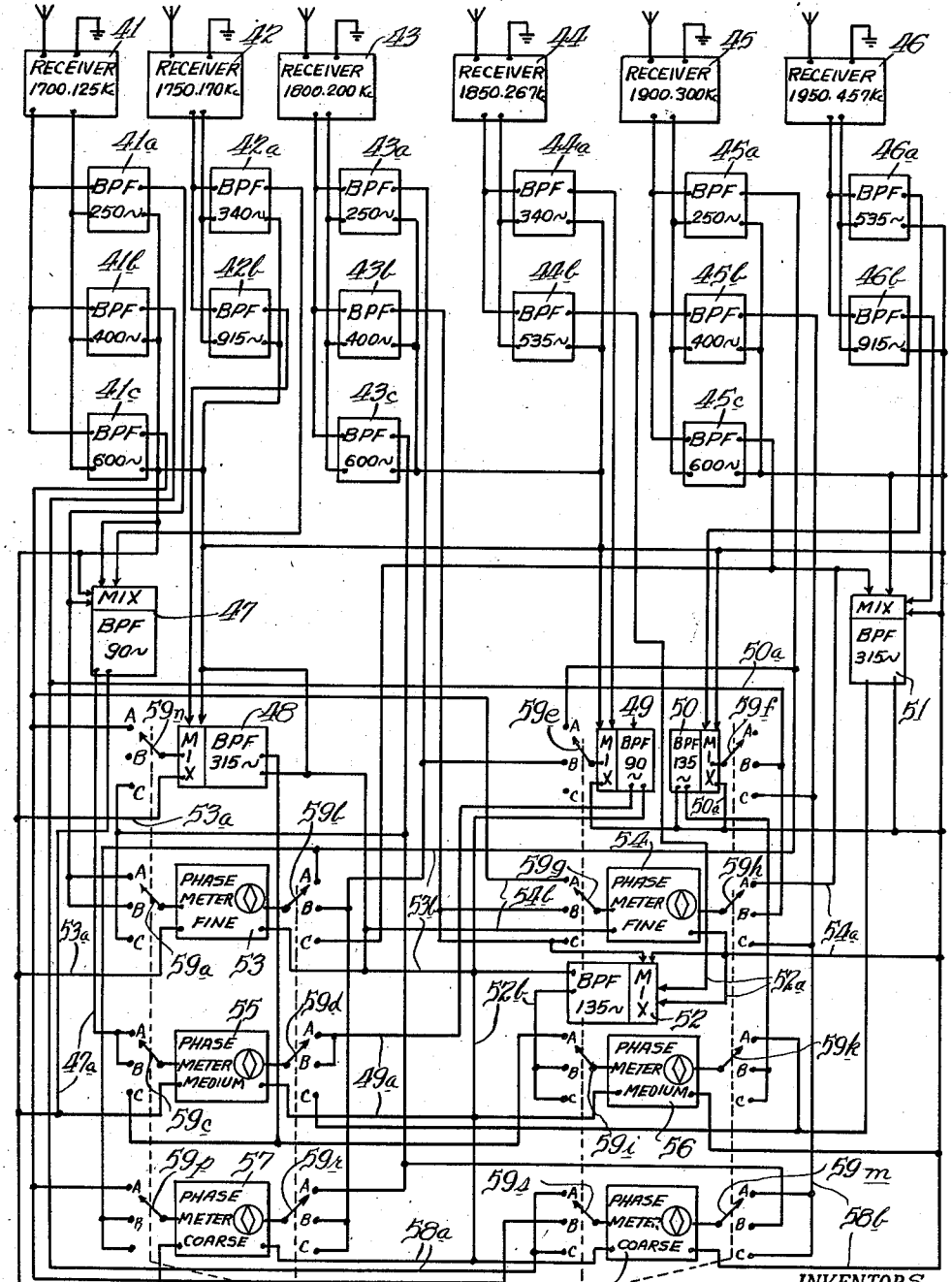

Jan. 21, 1958  J. E. HAWKINS ET AL  2,820,962
RADIO LOCATION SYSTEM
Filed April 23, 1954  4 Sheets-Sheet 4
*Fig. 4.*
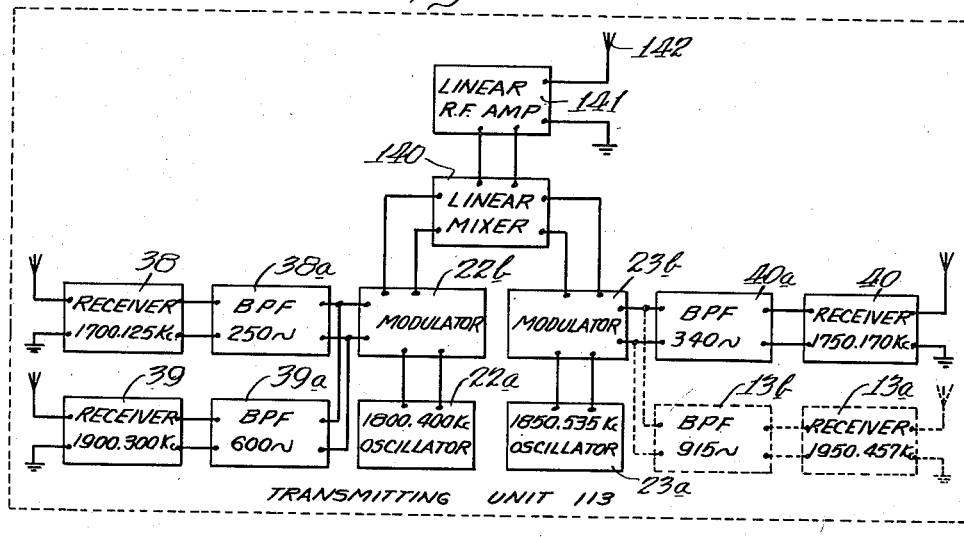
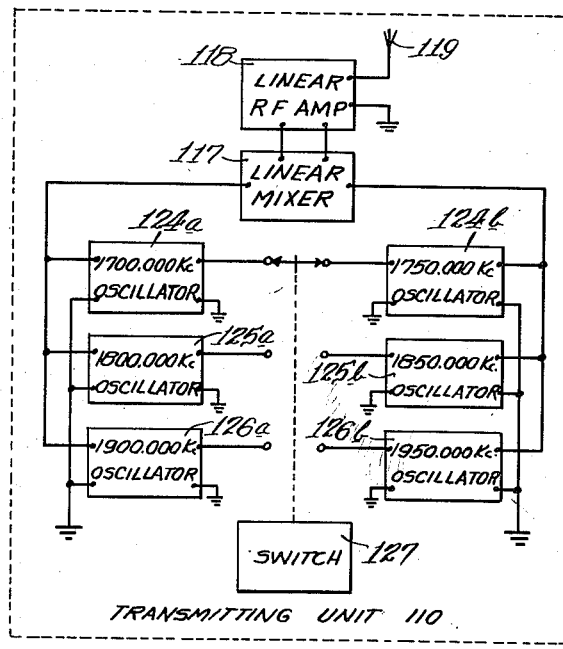
INVENTORS.
James E. Hawkins
Edward J. Crossland
By: Mason, Kolehmainen, Rathburn & Wyss
Attys.

United States Patent Office 2,820,962
Patented Jan. 21, 1958

2,820,962

RADIO LOCATION SYSTEM

James E. Hawkins, Broken Arrow, and Edward J. Crossland, Tulsa, Okla., assignors to Seismograph Service Corporation, Tulsa, Okla., a corporation of Delaware Application April 23, 1954, Serial No. 425,181

28 Claims. (Cl. 343—105)

The present invention relates to radio position finding systems and more particularly to improvements in radio position finding systems employing phase comparison in pairs of position indication signals radiated from a plurality of spaced transmitting points to provide indications from which the position of a mobile receiving point relative to the known positions of the transmitting points may be determined.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by isophase lines which are hyperbolic in contour about the transmitting points as foci. On a line connecting the pair of transmitters, these isophase lines are spaced apart a distance equal to one-half the mean wave length of the radiated waves and have diverging spacings at points on either side of this line. With this system arrangement, the position of a receiving point relative to a pair of hyperbolic isophase lines may be determined by measuring the phase relationship between continuous waves radiated from the pair of transmitters.

Since the point of location of the receiving point along the zone separating the two isophase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. To obtain the desired indications, however, it is necessary to maintain phase synchronization between the continuous waves radiated by the spaced transmitters, or alternatively, so to arrange the system that phase shifts between the radiated waves are compensated during the phase comparing operation.

To obviate the problem of phase synchronization, systems of the continuous wave hyperbolic type have been proposed (see Honore Patent No. 2,148,267 issued February 21, 1939) in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point relative to a pair of isophase lines.

An improved arrangement for eliminating the link transmitters without eliminating the functions thereof is disclosed and broadly claimed in Hawkins and Finn Patent No. 2,513,317, issued July 4 1950, wherein a pair of transmitters are alternately operated as link transmitters and as position signal transmitters.

Another problem encountered in the operation of continuous wave systems is that of eliminating ambiguity from the phase measurements which provide the desired position information. Thus while the two phase measurements identify the position of the receiving station relative to two intersecting pairs of hyperbolic isophase lines, they do not indicate the pairs of lines to which the indications are related. This means that in operating the system the geographic location of the receiving system must be known at the start of movement of the receiving system relative to the transmitting stations and, furthermore, that the successive wave lengths must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

In Patent No. 2,629,091 granted February 17, 1953, to James E. Hawkins entitled Radio Location System and assigned to the same assignee as the present invention, there is disclosed an improved radio location system of the continuous wave type which is free not only of phase sychronization difficulties but also of ambiguity problems. In the system of the said copending application, position indications are obtained having different sensitivities, termed phase sensitivities, insofar as the spacing of the isophase lines is concerned. More specifically, a plurality of low phase sensitivity position indications and a plurality of high phase sensitivity position indications are obtained, the low phase sensitivity indications being effective to locate the range of the high phase sensitivity indications and being characterized by widely spaced phase coincidences and the high phase sensitivity indications being characteriezd by closely spaced phase coincidences. The high and low phase sensitivity indications are obtained by producing pairs of beat frequency signals in accordance with the principles of the Honore system and then heterodyning these beat frequency signals to produce position indicating and reference signals for phase comparison which have phase sensitivities determined by phantom frequencies corresponding to the sum of or difference between the mean frequencies of the carrier waves from which the pairs of beat frequency signals were derived.

Systems of the type referred to are generally set up to cover a particular area of limited size and for this purpose the transmitters are spaced at optimum distances along two sides of the area to be surveyed to establish a hyperbolic pattern characterized by closely spaced isophase lines thereby providing maximum accuracy of phase indications in the survey area. Frequently, however, it becomes desirable to provide a system which affords complete 360° coverage of an extensive area without relocating the transmitting apparatus while the survey is in progress. One system for providing this complete area coverage is disclosed and broadly claimed in a copending joint application Serial No. 375,624, filed August 21, 1953 in the names of the present inventors.

In the system described in this application, coarse position indications are obtained by simultaneously modulating the carrier waves radiated by two of the transmitters with the same low frequency signal thereby effectively producing in space a family of hyperbolic isophase lines separated by an extremely large distance. Obviously, adjacent pairs of these widely spaced isophase lines cover an appreciable portion of the survey area and thus, if the position of the mobile unit between these lines can be accurately determined a completely non-ambiguous system is provided. However, the ambiguity resolution of this system is somewhat limited due to the fact that the error in the phase measurement of the coarse position indications cannot exceed one fine lane. Thus, if the widely spaced isophase lines are separated by a minimum of 1,000,000 feet, for example, and the closely spaced hyperbolic lines are separated by a minimum of 250 feet, the error appearing in the phase indications of the coarse position determining system must be less than 250 feet. Unless this condition is met the coarse indications are not determinative of the particular lane between adjacent closely spaced hyperbolic lines within which the mobile unit is located.

If the error in phase indication is to be maintained at less than 250 feet the error in phase meter reading of the coarse position determining system must be less than 0.009°, a condition which is extremely difficult to satisfy. Therefore, it is desirable to provide a system for resolving ambiguity which does not demand such extreme accuracy in the phase meter indications of the coarse position determining equipment.

In accordance with the present invention, complete coverage of a large area is achieved by a system similar to that disclosed in the above identified application Serial No. 375,624 but incorporating improved arrangements for obviating the ambiguity resolution problems mentioned above. The coarse position determinations provided by the system disclosed in the above identified application are employed in accordance with the present invention to establish the approximate area within which the mobile unit is operating and thus the signals from which these coarse position determinations are derived may be said to have low phase sensitivity. In addition, a plurality of medium phase sensitivity position indications and a plurality of high phase sensitivity position indications are obtained. The medium phase sensitivity indications are obtained by producing pairs of beat frequency signals which are heterodyned to produce position indicating and reference signals for phase comparison in a manner similar to that described in the above identified Patent No. 2,629,091. The coarse position indications thus locate the range of the medium phase sensitivity indications and the latter, in turn, identify the particular lane between the closely spaced isophase lines characterizing the high phase sensitivity indications within which the mobile unit is located.

It is an object of the present invention therefore to provide an improved radio location system of the continuous wave type which is free of phase synchronization difficulties of the character mentioned and in which disadvantages pertaining to ambiguity are entirely eliminated.

It is another object of the present invention to provide an improved radio location system of the continuous wave type which effects complete coverage of a relatively large area while at the same time providing completely non-ambiguous position indications.

It is a further object of the invention to provide a radio position finding system affording complete 360° coverage over an extensive area in which a plurality of low phase sensitivity indications, medium phase sensitivity, and high phase sensitivity indications are obtained, the low phase sensitivity indications being effective to locate the range of the medium phase sensitivity locations and the medium phase sensitivity indications being effective to locate the range of the high phase sensitivity indications.

It is a still further object of the present invention to provide a radio position finding system of the character described in which non-ambiguous position indications are obtained while employing a minimum number of channel frequencies.

Still another object of the invention is to provide a radio position indicating system of the character described wherein high phase sensitivity, medium phase sensitivity and low phase sensitivity position indications are obtained while employing a minimum number of carrier frequencies suitable for efficient long-range propagation.

A further object of the invention is to provide a radio position indicating system wherein high phase sensitivity, medium phase sensitivity, and low phase sensitivity position indications are obtained, each set of said indications being characterized by correspondingly spaced phase coincidences.

It is likewise an object of the present invention to provide improved transmission systems for use in radio location systems of the above-indicated character.

It is also an object of the invention to provide improved receiving equipment for use in radio location systems of the above indicated character.

The invention both as to its organization and method of operation, together with further objects and advantages thereof will best be understood by reference to the specification, taken in connection with the accompanying drawings, in which:

Fig. 1 is a diagrammatic representation of a four foci transmitting system embodying the present invention;

Fig. 2 diagrammatically illustrates in somewhat greater detail the arrangement of the equipment at the transmitting units embodied in the system of Fig. 1;

Fig. 3 is a diagrammatic representation of one form of mobile receiving equipment that may be employed in conjunction with the transmitting system shown in Fig. 1; and Fig. 4 is a diagrammatic representation of an alternative construction of the transmitting units shown in Fig. 1.

Referring now to the drawings and more particularly to Figs. 1 and 2 thereof, the present invention is illustrated as embodied in a four foci hyperbolic continuous wave transmission system for providing position information at one or more mobile receiving units, such as the unit 14 (Fig. 3) which may be carried by vessels or vehicles operating within the radius of transmission of four spaced transmitting units 10, 11, 12 and 13. These units are preferably spaced apart equal distances and are positioned in a star-like arrangement such that the base line 15 connecting the points of location of the units 10 and 11 is angularly related to the base line 16 connecting the points of location of the units 10 and 12, and, furthermore, the base line 17 connecting the points of location of units 10 and 13 is angularly related to both of the base lines 15 and 16. Thus the units 11, 12 and 13 are located approximately at the apexes of an imaginary equilateral triangle and the transmitting unit 10 is positioned near the center of this triangular configuration in order that the base lines 15, 16 and 17 approximate the angle bisectors of the equilateral triangle. These three base lines thus divide the area to be surveyed into three substantially equal sectors designated by the reference characters A, B and C in Fig. 1 which sectors, when taken together, constitute an entire 360° area about the unit 10 in which position information is desired at the mobile receiving unit.

As described more fully hereinafter, each of the transmitting units 11, 12 and 13 is equipped continuously to radiate a pair of carrier waves of different frequencies with the result that the three units generate three pairs of carrier wave signals having frequencies which differ not only between the pairs but also within the respective pairs. As will become evident as the description proceeds, the pair of carrier waves radiated by each of the transmitting units 11, 12 and 13 is adapted to be modulated during certain spaced intervals of operation with reference signals for transmission to the mobile receiving unit and during other spaced intervals of operation each pair of carrier waves functions to provide position indicating signals for transmission to the mobile receiving unit. The transmitting unit 10, on the other hand, is equipped sequentially to radiate three additional pairs of position indicating signals in the form of carrier waves having frequencies which not only differ from each other but also differ from the frequencies of each of the carrier waves radiated by the transmitting units 11, 12 and 13.

Specifically, as shown in Fig. 2, the transmitting unit 11 includes a pair of transmitters 18 and 19, the transmitter 18 consisting of an oscillator 18a, a modulator 18b and a power amplifier 18c and the transmitter 19 comprising an oscillator 19a, a modulator 19b and a power amplifier 19c. Similarly, the transmitting unit 12 includes a pair of transmitters 20 and 21, the transmitter 20 comprising an oscillator 20a, a modulator 20b and a power amplifier 20c and the transmitter 21 consisting of an oscillator 21a, a modulator 21b and a power amplifier 21c. In like manner the transmitting unit 13 includes a pair of transmitters 22 and 23, the transmitter 22 consisting of an oscillator 22a, a modulator 22b and a power amplifier 22c and the transmitter 23 comprising an oscillator 23a, a modulator 23b and a power amplifier 23c. The transmitting unit 10 comprises three pairs of transmitters 24a and 24b, 25a and 25b and 26a and 26b for respectively radiating position indicating carrier waves at six different carrier frequencies, together with a switching means designated in Fig. 1 by the reference character 27 for successively rendering each of these three pairs of transmitters operative.

In the arrangement illustrated, keying of the three pairs of transmitters 24a and 24b, 25a and 25b and 26a and 26b for alternate operation is accomplished, as best shown in Fig. 2, by alternately feeding anode current to the electron discharge tubes of the respective pairs of transmitters from the positive terminal 28 of an anode current source, not shown, through a commutating ring 29 which is mechanically coupled by means of a shaft 30 to be driven at constant speed by a synchronous motor and gear train unit 31. More specifically, the positive terminal 28 of the anode current source is connected to the conductive segment 29a of the commutating ring 29 which segment spans slightly less than one-third of the circumference of the ring. The remainder of the commutating ring is comprised of an insulating segment 29b. At points spaced equidistant around the circumference of the ring, brushes 29c, 29d and 29e are provided which are respectively connected to the positive bus conductors of the three pairs of transmitters 24a and 24b, 25a and 25b and 26a and 26b. The arrangement is such that anode current is successively delivered to the electron discharge tubes of each of these three pairs of transmitters, and since the conductive segment 29a of the ring 29 represents slightly less than one-third of the periphery surface of the ring it will be understood that a short off signal period is provided between successive periods during which the pairs of transmitters are sequentially operating, thus preventing simultaneous radiation of waves by more than one pair of the transmitters. The periodicity with which the three pairs of transmitters operate is, of course, dependent upon the speed of rotation of the commutating ring 29. Preferably this ring is driven at a speed of one revolution per second whereby the pairs of transmitters are each rendered operative at one-third second intervals.

As indicated above, the carrier frequencies at which the twelve transmitters of the four transmitting units 10, 11, 12 and 13 operate are all different. Preferably, however, these carrier waves are so grouped that the frequencies of each pair are well within a single channel allocation of 10 kilocycles as specified by the Federal Communications Commission of the United States Government. The output frequency of the transmitter 24a and the output frequency of the transmitter 18 at the unit 11, forming a first carrier wave pair, may be 1700.000 and 1700.250 kilocycles, respectively, such that the difference frequency therebetween is 250 cycles, while the output frequencies of the transmitters 24b and the transmitter 19 at the unit 11, forming a second carrier wave pair, may be 1750.000 and 1750.340 kilocycles, respectively, such that the difference frequency therebetween is 340 cycles. The output frequency of the transmitter 25a and the transmitter 22 at the unit 13, forming a third carrier wave pair, may be 1800.000 and 1800.400 kilocycles, respectively, such that the difference frequency therebetween is 400 cycles, whereas the output frequencies of the transmitter 25b and the transmitter 23 at the unit 13, forming a fourth carrier wave pair, may be 1850.000 and 1850.535 kilocycles, respectively, such that the difference frequency therebetween is 535 cycles. Similarly, the output frequency of the transmitter 26a and the output frequency of the transmitter 20 at the unit 12, forming a fifth carrier wave pair, may be 1900.000 and 1900.600 kilocycles, respectively, such that the difference frequency therebetween is 600 cycles and finally the transmitter 26b and the transmitter 21 at the unit 12 forming a sixth carrier wave pair, may radiate carrier waves at frequencies of 1950.000 and 1950.915 kilocycles, respectively, such that the difference frequency therebetween is 915 cycles. It will be noted that the channels in which the six pairs of carrier frequencies fall are separated from each other in the frequency spectrum by approximately 50 kilocycles thus facilitating selective reception of these carrier pairs in the manner more fully explained below. The power of the twelve transmitters is such that the three areas A, B and C in which position information may be desired aboard the vehicle or vessel carrying the receiving unit 14 are blanketed with waves radiated from certain pairs of the transmitters having sufficient strength to permit reliable reception of the desired ones of the carrier waves as will become evident as the description proceeds.

In order to obviate the above mentioned difficulties attendant upon phase synchronization of the position indicating carrier waves radiated by the twelve transmitters while at the same time eliminating the necessity for employing additional channel frequencies, means are provided at the transmitting units 11, 12 and 13 for successively modulating the waves radiated by the pair of transmitters at each of these units with reference signals representative of the difference frequencies between the carrier wave pairs. The equipment for this purpose, as provided at the transmitting unit 11, comprises a fixed tuned amplitude modulation receiver 32 center tuned to a frequency of 1800.200 kilocycles and selective to the 1800.000 and 1800.400 kilocycle carrier waves respectively radiated by the transmitters 25a and 22. The selectivity of this receiver is obviously such that the carrier waves radiated by the transmitters 18, 19, 20, 21, 23, 24a, 24b, 25b, 26a and 26b are all rejected in the radio frequency section thereof. The beat frequency of 400 cycles between the two carrier waves accepted by the radio frequency section of the receiver 32 is reproduced in the audio frequency section of this receiver and delivered through band pass filter 32a, center tuned to a frequency of 400 cycles, to the modulator 18b (Fig. 2) for amplitude modulation upon the carrier wave output of the transmitter 18. The transmitting unit 11 also includes an amplitude modulation receiver 33 fixed tuned to a center frequency of 1900.300 kilocycles and selective to the carrier waves radiated by the transmitters 26a and 20. Here again the selectivity of the receiver 33 is such that the carrier waves radiated by all of the other transmitters in the transmitting system are rejected. The receiver 33 functions to heterodyne the carrier waves accepted thereby and to reproduce at its output terminals a 600 cycle beat frequency or difference frequency signal for application to the modulator 18b through a band pass filter 33a center tuned to a frequency of 600 cycles.

To provide a means for applying signals in the form of modulation signals upon the carrier wave radiated by the transmitter 19, the transmitting unit 11 also includes an amplitude modulation receiver 34 fixed tuned to a center frequency of 1950.457 kilocycles and selective to the carrier waves radiated by the transmitter 26b and 21, the selectivity of this receiver obviously being such that the carrier waves radiated by all of the other transmitters of the system are rejected. The two carrier waves accepted by the receiver 34 are heterodyned in order to reproduce a 915 cycle beat frequency signal which is applied through the band pass filter 34a, center tuned to a frequency of 915 cycles, for application to the modulator 19b whereby this beat frequency signal is modulated upon the carrier wave radiated by the transmitter 19.

Also for the purpose of obviating phase synchronization difficulties, the transmitting unit 12 includes at least three amplitude modulation receivers 35, 36 and 37. The receiver 35 is fixed tuned to a center frequency of 1700.125 kilocycles and is sufficiently selective to reject the carrier waves radiated by all of the transmitters except those emanating from the transmitter 24a at the unit 10 and the transmitter 18 at the unit 11. The 250 cycle beat frequency signal between the two carrier waves accepted by the receiver 35 is applied through band pass filter 35a, center tuned to a frequency of 250 cycles, to the modulator 20b for amplitude modulation upon the carrier wave radiated by the transmitter 20. The receiver 36 is center tuned to a frequency of 1800.200 kilocycles and is thus receptive only to the carrier waves radiated by the transmitter 25a at the unit 10 and the transmitter 22 at the unit 13. These two carrier waves are heterodyned by the receiver 36 in order to reproduce at its output terminals a 400 cycle beat frequency signal which is applied through band pass filter 36a to the modulator 20b for amplitude modulation upon the carrier wave output of the transmitter 20. The receiver 37 is fixed tuned to a center frequency of 1850.267 kilocycles and is sufficiently selective to reject the carrier waves radiated by all of the transmitters except the transmitter 25b at the unit 10 and the transmitter 23 at the unit 13. The two carrier waves accepted by receiver 37 are heterodyned to reproduce a 535 cycle beat frequency signal for application through the band pass filter 37a to the modulator 21b where this beat frequency signal is modulated upon the carrier wave radiated by the transmitter 21.

In similar manner, the transmitting unit 13 includes at least three fixed tuned receivers 38, 39 and 40, each center tuned to a different frequency. In particular, the receiver 38 is center tuned to a frequency of 1700.125 kilocycles and is selective only to the carrier waves radiated by the transmitter 24a at the unit 10 and the transmitter 18 at the unit 11. These two carrier waves are heterodyned by the receiver 38 in order to reproduce a 250 cycle beat frequency signal for application through the band pass filter 38a to the modulator 22b where the beat frequency signal is modulated upon the carrier wave output of the transmitter 22. The receiver 39 is center tuned to a frequency of 1900.300 kilocycles and is receptive only to the carrier waves radiated by the transmitter 26a at the unit 10 and the transmitter 20 at the unit 12. The beat frequency signal of 600 cycles between the two carrier waves accepted by the receiver 39 is reproduced at the output terminals of the receiver and is passed through the band pass filter 39a to the modulator 22b which, of course, functions to modulate the carrier wave output of the transmitter 22 with this beat frequency signal. The receiver 40 is center tuned to a frequency of 1750.170 kilocycles and is selective only to the carrier waves radiated by the transmitter 24b at the unit 10 and the transmitter 19 at the unit 11. The 340 cycle beat frequency signal between the carrier waves accepted by the receiver 40 is applied through the band pass filter 40a to the modulator 23b for amplitude modulation upon the carrier wave output of the transmitter 23.

Each of the transmitting units 11, 12 and 13 may also include an additional receiver and band pass filter as represented by the dotted line components shown in Figs. 1 and 2 for purposes which will be explained more fully hereinafter. For example, the transmitting unit 11 may include an additional receiver 11a center tuned to a frequency of 1850.267 kilocycles and selective only to the carrier waves radiated by the transmitter 25b at the unit 10 and the transmitter 23 at the unit 13. The 535 cycle beat frequency signal between the two carrier waves accepted by the receiver 11a is passed through band pass filter 11b to the modulator 19b. The additional receiver 12a at the transmitting unit 12 may be center tuned to a frequency of 1750.170 kilocycles to be selective only to the carrier waves radiated by the transmitter 24b at the unit 10 and the transmitter 19 at the unit 11. The 340 cycle beat frequency signal between the two carrier waves accepted by the receiver 12a is passed through band pass filter 12b to the modulator 21b. In like manner, the additional receiver 13a at the transmitting unit 13 is center tuned to a frequency of 1950.457 kilocycles and is selective only to the carrier waves radiated by the transmitter 26b at the unit 10 and the transmitter 21 at the unit 12. The 915 cycle beat frequency signal between the two carrier waves accepted by the receiver 13a is applied through band pass filter 13b to the modulator 23b. As previously indicated, the use of the additional receivers 11a, 12a and 13a and their associated band pass filters is entirely optional and, consequently, for the purpose of simplification, it will be assumed in the ensuing description that the transmitting units 11, 12 and 13 include only the component elements shown in solid lines.

In effect transmitters 24a and 26a at the unit 10 and the transmitters 18 and 20 at the units 11 and 12, respectively, constitute a system for producing a grid of intersecting hyperbolic closely spaced isophase lines to blanket the area designated by the reference character A in Fig. 1 in which the transmitting units 10 and 11 and the units 10 and 12 are respectively located at the foci of the two sets of isophase lines forming the hyperbolic patterns. Similarly, the transmitters 25a and 26a at the unit 10 and the transmitters 20 and 22 at the units 12 and 13, respectively, effectively produce a grid of closely spaced hyperbolic lines covering the area designated by the reference character C in Fig. 1 in which the units 10 and 12, and the units 10 and 13 are respectively located at the foci of the two sets of isophase lines forming the hyperbolic pattern. The transmitters 24a and 25a at the unit 10 and the transmitters 18 and 22 at the units 11 and 13, respectively, effectively produce in space a grid of closely spaced hyperbolic isophase lines which blanket the area designated by the reference character B in which the transmitting units 10 and 11 and 10 and 13 are positioned at the foci of the two sets of isophase lines which form the hyperbolic pattern. Thus the entire survey area is blanketed with different grid-like patterns of closely spaced isophase lines to facilitate the accurate determination of the position of the mobile receiving unit in a manner which will subsequently be described in detail.

Turning now to Fig. 3, there is illustrated a mobile receiving unit 14 which is capable of being rendered operative to translate the received signals from the spaced transmitting units into position indications in all three of the areas A, B and C. It will be apparent that this receiving unit includes six amplitude modulation receivers 41, 42, 43, 44, 45 and 46 each center tuned to a different frequency to facilitate selective reception of the radiated carrier waves. The receiver 41 is fixed tuned to a center frequency of 1700.125 kilocycles and is sufficiently selective to accept the carrier waves radiated by the transmitters 24a and 18 both when modulated and unmodulated, and to reject the carrier waves radiated by all of the other transmitters of the transmitting system. The receiver 42, which is fixed tuned to a center frequency of 1750.170 kilocycles, is sufficiently selective to accept the carrier waves radiated by the transmitters 24b and 19 both when modulated and unmodulated. Similarly, the receiver 43, which is fixed tuned to a center frequency of 1800.200 kilocycles, is receptive only to the carrier waves radiated by the transmitters 25a and 22 both when modulated and unmodulated, and the receiver 44 which is center tuned to a frequency of 1850.267, is sufficiently selective to reject all of the radiated carrier waves except those radiated by the transmitters 25b and 23. As indicated in Fig. 3, the receiver 45 is center tuned to a frequency of 1900.300 kilocycles and is selective only to the carrier waves radiated by the transmitters 26a and 20 and the receiver 46, which is center tuned to a frequency of 1950.457 kilocycles, is receptive only to the carrier waves radiated by the transmitters 26b and 21.

For the purpose of separating the various beat frequency and reference signals which are produced by the receivers at the mobile receiving unit, this unit includes a plurality of conventional band pass filters 41a, 41b, 41c, 42a, 42b, 43a, 43b, 43c, 44a, 44b, 45a, 45b, 45c, and 46a and 46b. The receiving unit also includes a plurality of mixer filter combinations designated by the reference characters 47, 48, 49, 50, 51 and 52, the purposes of which will become evident as the description proceeds. To translate the reproduced signals into position indications there are provided at the receiving unit three pairs of phase indicating meters, one pair of these meters being termed fine position indicators and being designated by the reference characters 53 and 54, a second pair of these meters being termed medium phase position indicators and being designated by the reference characters 55 and 56, and a third pair of these phase meters 57 and 58 being termed coarse position indicators. In order to connect the outputs of the various filters to preselected ones of the pairs of phase meters when the receiving unit is operated in different ones of the areas A, B and C, the receiving unit also includes a ganged, fifteen section, three position area selector switch 59, the three positions of which may be used selectively to render the receiving unit 14 operative to provide position indications within each of the areas A, B and C. The phase meters 53 to 58, inclusive, may be of standard commercial construction but preferably are of the general character disclosed in Hawkins et al. Patent No. 2,551,211 granted May 1, 1951. Each phase meter is equipped with a rotor carrying a pointer which indexes with a circular scale to indicate the phase relationship between the two impressed voltages. If desired, each meter may also be equipped with a revolution counter gear driven from the rotor of the meter to count the isophase lines traversed by the mobile receiving unit during movement of the vessel or vehicle carrying this unit within the survey area.

In considering the operation of the above described position determining system, it will be understood that when the motor and gear train unit 31 is operating to drive the commutating ring 29, anode current is sequentially delivered to the electron discharge tubes of the pairs of transmitters 24a and 24b, 25a and 25b and 26a and 26b whereby each of these pairs of transmitters is successively rendered operative to radiate carrier waves at the indicated frequencies. The pairs of transmitters at the units 11, 12, and 13, on the other hand, operate continuously. Accordingly, during each interval when the transmitters 24a and 24b are in operation, transmitters 18 and 19 at the unit 11 are also operative to radiate carrier waves. Carrier waves of 1750.000 kilocycles and 1750.340 kilocycles, respectively radiated by the transmitters 24b and 19, are picked up and heterodyned in the radio frequency sections of the receiver 40 at the unit 13 and the receiver 42 at the mobile receiving unit 14. During this same interval the carrier waves of 1700.000 kilocycles and 1700.250 kilocycles, respectively radiated by the transmitters 24a and 18, are received and heterodyned by the receiver 35 at the unit 12, by the receiver 38 at the unit 13, and by the receiver 41 at the mobile receiving unit 14. The receiver 35 functions to reproduce the difference frequency of 250 cycles between the two accepted carrier waves which signal is applied through band pass filter 35a to the modulator 20b for modulation as a reference signal on the carrier wave radiated by the transmitter 20.

Since the pairs of transmitters 25a and 25b and 26a and 26b are all inoperative during this particular interval of operation, the receivers 36 and 37 at the unit 12 do not heterodyne any carrier waves. Also, for this same reason, the receivers 32, 33 and 34 at the unit 11 do not function as heterodyning receivers during this particular interval of operation. The receiver 38 at the unit 13, however, heterodynes the two carrier waves accepted thereby and reproduces a 250 cycle beat frequency signal for modulation as a reference signal upon the carrier wave radiated by the transmitter 22. During this same interval the receiver 40 at the unit 13 heterodynes the carrier waves received from the transmitters 24b and 19 and produces a 340 cycle beat frequency signal for modulation as a reference signal upon the carrier wave radiated by the transmitter 23.

The modulated carrier wave radiated by the transmitter 22 is received by the receivers 32 and 36 at the units 11 and 12, respectively, but the band pass filters 32a and 36a function to reject the 250 cycle modulation component reproduced by these receivers and, therefore, this modulation signal does not disturb the operation of the transmitting units 11 and 12. Likewise the modulated carrier wave radiated by the transmitter 23 is also received by the receiver 37 at the unit 12 but the 340 cycle modulation component appearing thereon is rejected by the filter 37a and, consequently, is not passed to the modulator 21b of the transmitter 21. To summarize, during the first interval of operation the transmitters 22 and 23 at the unit 13 are both operative to radiate carrier waves modulated by reference signals of 250 cycles and 340 cycles, respectively, the transmitters 24a and 24b at the unit 10 are both operative to radiate position indicating signals in the form of unmodulated carrier waves, the transmitters 18 and 19 at the unit 11 are both operative to radiate position indicating signals in the form of unmodulated carrier waves, and the transmitter 20 at the unit 12 is operative to radiate a carrier wave modulated with a 250 cycle reference signal.

The position indicating signals radiated by the transmitters 24a and 18 are received by the receiver 41 at the mobile receiving unit which functions to heterodyne these two carrier waves in order to reproduce a 250 cycle beat frequency signal for application through the band pass filter 41a to the mixer 47 and to suitable contacts of section 59a of the area selector switch 59. Assuming that the mobile receiving unit is located in the area designated by the reference character A, the area selector switch 59 is placed in the position marked A in order to provide position indications representative of the location of the receiving unit within this particular area. With the area selector switch in this position, the output of the band pass filter 41a is applied to the left hand set of input terminals of the phase meter 53 through the signal carrying conductors 53a and through the closed contacts of the switch section 59a. The modulated carrier wave radiated by the transmitter 20 at the unit 12 is received by the receiver 45 at the mobile receiving unit and the 250 cycle modulation signal appearing thereon is reproduced at the output terminals of this receiver. The band pass filter 45a passes this modulation signal and applies the same through signal connectors 53b and through the closed contacts of section 59b of the area selector switch to the right hand set of input terminals of the phase meter 53. This phase meter provides an indication which is representative of the phase relationship existing between the two applied signals and thus indicates the location of the mobile receiving unit between adjacent isophase lines effectively produced in the area A by the radiation of position indicating signals from the transmitters 24a and 18 at the units 10 and 11, respectively. These isophase lines are spaced relatively close together along the base line 15 joining the units 10 and 11 since, as indicated above, the isophase lines are separated by a distance corresponding to one-half wave length of the mean frequency between the carrier waves radiated by the transmitters 24a and 18 which at the indicated frequencies corresponds to a spacing of 281 feet. Thus the indication provided by the meter 53 identifies the position of the mobile receiving unit within a zone having a 281 foot minimum width and, consequently, this indication may be termed a fine or accurate position indication.

To obtain a medium phase sensitivity position indication relative to the same units 10 and 11, the receiver 42 at the mobile unit 14 heterodynes the carrier waves radiated by the transmitter 24b at the unit 10 and the transmitter 19 at the unit 11 in order to reproduce a 340 cycle beat frequency signal for application through the band pass filter 42a to the upper set of signal input terminals of the mixer filter 47. The mixer 47 heterodynes the 340 cycle signal applied thereto from the filter 42a with the 250 cycle signal from the filter 41a in order to reproduce a 90 cycle double heterodyne signal for application through signal connectors 47a and through the closed contacts of section 59c of the area selector switch to the left hand set of input terminals of the phase meter 55. To provide a reference signal for application to the phase meter 55, the 340 cycle modulation signal appearing on the carrier wave output of the transmitter 23 at the unit 13 is reproduced by the receiver 44 and applied through the band pass filter 44a to the upper set of input terminals of the mixer filter 49. The mixer 49 functions to heterodyne the 340 cycle modulation signal from the band pass filter 44a with the 250 cycle signal from the filter 45a applied thereto through the closed contacts of section 59e of the area selector switch. The 90 cycle double heterodyne signal which is thus produced is applied through signal connectors 49a and through the closed contacts of section 59d of the area selector switch to the right hand set of input terminals of the phase meter 55. The two double heterodyne signals impressed upon the two sets of input terminals of the phase meter 55 are phase compared by this meter to provide an indication of the phase relationship therebetween. For reasons which will be apparent from an understanding of the difference frequency principle as fully disclosed in United States Patent No. 2,652,558 granted September 15, 1953 to James E. Hawkins and assigned to the same assignee as the present application, it will be understood that the phase relationship between the 90 cycle double heterodyne signals applied to the input terminals of the phase meter 55 varies as a direct function of the position of the mobile receiving unit relative to two adjacent isophase lines having the transmitting units 10 and 11 as foci and these isophase lines have a spacing which is determined by the difference between the mean or average frequencies of the two sets of signals radiated from the pair of transmitters 24a and 24b at the unit 10 and from the pair of transmitters 18 and 19 at the unit 11. More specifically, along the base line connecting the two transmitting units 10 and 11 this spacing is equal to one-half the wave length of a signal having a frequency of about 50 kilocycles, a distance of approximately 9,840 feet, which is approximately thirty-five times greater than the spacing between the isophase lines relative to which position indications are provided by the phase meter 53 of the fine or narrow lane position indicating equipment. The accuracy of the medium phase sensitivity position indicating facilities including the phase meter 55 is, of course, far less than that of the fine or narrow lane position indicating facilities including the phase meter 53. The accuracy of the medium phase sensitivity indicating facilities, however, is entirely adequate to insure identification of the particular narrow lane in which fine indications are obtained on the phase meter 53.

During the particular interval of operation described above, the various band pass filters and the area selector switch, which it should be remembered is in the A position for operation of the mobile receiving unit 14 within the area A, prevent the application of position indicating and reference signals to the phase meters 54, 56, 57 and 58 and, consequently, these meters provide no position indications. To summarize, during each interval when the transmitters 24a and 24b at the unit 10 are in operation the phase meters 53 and 55 respectively provide fine and medium position indications relative to two sets of differently spaced hyperbolic isophase lines both sets of which have transmitting units 10 and 11 as foci.

At the end of the described transmitting interval, the commutating ring 29 functions to interrupt the circuit for delivering anode current to the tubes of the transmitters 24a and 24b, with the result that carrier wave radiation from this pair of transmitters is terminated. When radiation of this pair of waves stops, the carrier heterodyning action of the receivers 41 and 42 at the mobile receiving unit, of the receivers 38 and 40 at the transmitting unit 13, and of the receiver 35 at the transmitting unit 12 is likewise terminated to interrupt the production of beat frequency signals from these receivers. Thus the radiation of reference signals by the transmitter 20 and by the transmitters 22 and 23 ceases. In absence of beat frequency signals at the output of the receivers 41 and 42 and in the absence of modulation signals at the output of the receivers 44 and 45, the phase meters 53 and 55 are rendered ineffective to further change the setting of their indicating elements.

A short time interval after the transmitters 24a and 24b at the unit 10 are rendered inoperative, the commutating ring 29 functions to deliver anode current to the tubes of the transmitters 25a and 25b thus initiating operation of this pair of transmitters. At the transmitting unit 11, the 1800.00 kilocycle carrier wave radiated by the transmitter 25a is heterodyned in the receiver 32 with the 1800.400 kilocycle carrier wave continuously radiated by the transmitter 22 at the unit 13 in order to reproduce a 400 cycle beat frequency signal for application through the band pass filter 32a to the modulator 18b. The transmitters 25a and 25b at the unit 10 are both inoperative during this period of operation and thus receivers 33 and 34 at the transmitting unit 11 develop no beat frequency signals. At the transmitting unit 12 the carrier waves radiated by the transmitter 25a and the transmitter 22 are heterodyned in the receiver 36 to reproduce a 400 cycle beat frequency signal for application through band pass filter 36a to the modulator 20b. The receiver 37 heterodynes the 1850.000 kilocycle carrier wave radiated by the transmitter 25b with the 1850.535 kilocycle carrier wave radiated by the transmitter 23 at the unit 13 in order to develop a 535 cycle beat frequency signal for application through the band pass filter 37a to the modulator 21b. Since the transmitter 24a at the unit 10 is inoperative during this particular period of operation the receiver 35 develops no heterodyne or beat frequency signals. The latter receiver, of course, responds to the carrier wave radiated by the transmitter 18 at the unit 11 but the 400 cycle modulation component appearing on this carrier wave is rejected by the band pass filter 35a and thus does not affect the operation of the transmitting unit 12.

At the transmitting unit 13, the receivers 38, 39 and 40 are incapable of heterodyning carrier waves due to the absence of signals from the transmitters 24a, 24b and 26a during this interval of operation. The receiver 38 responds to the modulated carrier wave radiated by the transmitter 18 at the unit 11 but the 400 cycle modulation component of this signal is rejected by the band pass filter 38a. Similarly, the receiver 39 is energized by the modulated carrier wave signal radiated by the transmitter 20 at the unit 12 but the 400 cycle modulation component is rejected by the band pass filter 39a. To summarize, during the second interval of operation, the transmitters 25a and 25b at the unit 10 are both operative to radiate position indicating signals, the transmitters 22 and 23 at the unit 13 are both operative to radiate position indicating signals in the form of unmodulated carrier waves, the transmitter 18 at the unit 11 radiates a reference signal in the form of a modulated carrier wave and the transmitters 20 and 21 at the unit 12 both radiate reference signals in the form of carrier waves modulated by signals of different frequency.

The position indicating signals radiated by the transmitter 25a and the transmitter 22 are heterodyned in the receiver 43 at the mobile receiving unit 14 in order to produce a 400 cycle beat frequency signal which is passed by the filter 43b and is, of course, rejected by the filters 43a and 43c. The output of the filter 43b is confronted by an open circuit at section 59g of the area selector switch with the switch in the A position as indicated above, but this signal is applied to the upper set of input terminals of the mixer filter 52. The receiver 44 heterodynes the carrier waves radiated by the transmitter 25b and the transmitter 23 and reproduces a 535 cycle beat frequency signal which is passed by the filter 44b but is rejected by the filter 44a. The signal passed by the filter 44b is applied through signal connectors 52a to the mixer 52 where it is mixed with the 400 cycle signal from the filter 43b in order to develop a 135 cycle double heterodyne signal at the output terminals 52b of the mixer. Since the signal connectors 52b are confronted by an open circuit at the area selector switch section 59i these signals are not passed to the phase meter 56. The receiver 46 responds to the modulated carrier wave radiated by the transmitter 21 at the unit 12 and reproduces the 535 cycle signal modulation component for application through the band pass filter 46a to the upper set of signal input terminals of the mixer filter 50. However, the right hand set of signal input terminals of this mixer filter is confronted by an open circuit at section 59f of the area selector switch and, consequently, no output signals are developed by this mixer.

To provide a coarse or wide lane position indication, the modulated signal radiated by the transmitter 18 at the unit 11 is received by the receiver 41 which functions to reproduce the 400 cycle modulation component for application through the band pass filter 41b, through the signal connectors 58a, and through the closed contacts of section 59s of the area selector switch to the left hand set of input terminals of the phase meter 58. To this same end the receiver 45 reproduces the 400 cycle modulation signal appearing upon the carrier wave signal radiated by the transmitter 20 at the unit 12 and applies the same through the band pass filter 45b, through the signal connectors 58b and through the closed contacts of section 59n of the area selector switch to the right hand set of input terminals of the phase meter 58. Since the two signals applied to the opposite sets of input terminals of the phase meter 58 resulted from a heterodyning of the same two carrier wave signals at the transmitting units 11 and 12, respectively, the phase relationship between these signals is representative of the position of the mobile receiving unit 14 relative to two adjacent isophase lines having the transmitting units 11 and 12 as foci and having a spacing which is determined by the modulation frequency appearing on the carrier waves radiated by the transmitters 18 and 20 at these units.

More specifically, along the base line connecting the units 11 and 12 this spacing is equal to one-half the wave length of a signal having a frequency of 400 cycles, a distance of approximately 1,230,000 feet, which is 125 times greater than the spacing between the isophase lines relative to which position indications are provided by the phase meter 55 of the medium lane position indicating facilities. The accuracy of the coarse lane position indication facilities including the phase meter 58 is, of course, far less than that of either the fine or narrow lane position indicating facilities including the phase meter 53 or the medium lane position indicating facilities including the meter 55. However, the accuracy of the coarse or wide lane facilities is entirely adequate to insure identification of the particular medium lane in which medium phase sensitivity indications are being provided by the phase meter 55. To summarize, during each period when the transmitters 25a and 25b at the unit 10 are in operation all of the phase meters at the mobile receiving unit 14 are devoid of input signals except for the phase meter 58 which provides a coarse or wide lane position indication.

At the end of the second transmitting interval, the commutating ring 29 functions to terminate the delivery of anode current to the tubes of the transmitters 25a and 25b thus arresting operation of this pair of transmitters. As a consequence, the heterodyne action taking place at the receiver 32 of the unit 11 and the receivers 36 and 37 at the unit 12 ceases with the result that the carrier waves radiated by the transmitters 18, 20 and 21 are no longer modulated with reference signals. In the absence of modulation signals on the carrier waves received by the receivers 41 and 45 at the mobile receiving unit 14, the delivery of signals to the phase meter 58 is terminated thus rendering this meter ineffective to change the setting of its indicating element. A short time interval after operation of the transmitters 25a and 25b is arrested, the commutating ring 29 functions to complete the circuit for delivering anode current to the tubes of the transmitters 26a and 26b and thus initiates operation of this pair of transmitters to begin the third interval of operation.

At the transmitting unit 11, the carrier wave radiated by the transmitter 26a is heterodyned in receiver 33 with the wave radiated by the continuously operating transmitter 20 at the unit 12 with the result that a 600 cycle beat frequency signal is produced for application through the band pass filter 33a to the modulator 18b. The receiver 34 heterodynes the carrier wave radiated by the transmitter 26b with the wave radiated by the continuously operating transmitter 21 at the unit 12 in order to produce a 915 cycle beat frequency signal for application through the band pass filter 34a to the modulator 19b. The receiver 32 does not function as a heterodyning receiver during this interval of operation due to the absence of carrier wave signals from the transmitter 25a.

At the transmitting unit 12, the receivers 35, 36 and 37 are likewise incapable of heterodyning carrier wave signals during the third interval of operation due to the fact that the transmitters 24a, 24b, 25a and 25b, at the unit 10, are all inoperative during this period. The receiver 35 reproduces the 600 cycle modulation component appearing on the carrier wave radiated by the transmitter 18 but the band pass filter 35a rejects this signal and prevents its application to the modulator 20b.

At the transmitting unit 13 the carrier wave radiated by the transmitter 26a is heterodyned in receiver 39 with the wave radiated by the continuously operating transmitter 20 at the unit 12 in order to reproduce a 600 cycle beat frequency signal for application through the band pass filter 39a to the modulator 22b. The receivers 38 and 40 do not function as heterodyning receivers since the transmitters 24a and 24b at the unit 10 are both inoperative. To summarize, during the third interval of operation, the transmitters 26a and 26b at the unit 10 are both operative to radiate position indicating signals, the transmitters 20 and 21 at the unit 12 are both operative to radiate position indicating signals, the transmitter 22 at the unit 13 is operative to radiate reference signals in the form of a modulated carrier wave, and the transmitters 18 and 19 at the unit 12 are both operative to radiate reference signals in the form of modulated carrier wave signals each having a signal of different frequency modulated thereon.

At the receiving unit 14, the receiver 45 heterodynes the carrier wave radiated by the transmitter 26a and the carrier wave radiated by the transmitter 20 at the unit 12 in order to produce a 600 cycle signal for application through the band pass filter 45c, through signal connectors 54a and through closed contacts of section 59h of the area selector switch to the right hand set of input terminals of the phase meter 54. To provide a reference signal for phase comparison with this beat frequency signal, receiver 41 reproduces the 600 cycle modulation component appearing on the carrier wave radiated by the transmitter 18 at the unit 11 and applies the same through the band pass filter 41c, through signal connectors 54b and through the closed contacts of section 59g of the area selector switch to the left hand set of input terminals of the phase meter 54. The phase meter 54 thus measures the phase relationship between the two 600 cycle signals applied to its opposite sets of input terminals with the result that this meter indicates the position of the mobile receiving unit 14 relative to two adjacent and closely spaced hyperbolic isophase lines having the transmitting units 10 and 12 as foci. More specifically, the spacing between the isophase lines along the base line connecting the two transmitting units 10 and 12 is equal to one-half the wave length of the mean or average of the 1900 kilocycle and the 1900.6 kilocycle signals radiated from the transmitters 26a and 20. At the indicated frequencies these isophase lines are spaced apart approximately 259 feet and thus the phase meter 54 provides a fine or narrow lane position indication.

Since the medium lane position indication provided by the medium position indicating facilities including the phase meter 55 is ambiguous in the sense that this indication standing alone does not identify the position of the mobile receiving unit 14 along the medium phase sensitivity isophase line identified by the indication on the meter 55, it is necessary to provide a second medium lane position indication. To this end the 600 cycle heterodyne signal passed by the filter 45c is applied to the upper set of signal input terminals of the mixer filter 51 where it is heterodyned with a second heterodyne signal of 915 cycles developed by the receiver 46 as a result of heterodyning the carrier waves radiated by the transmitter 26b and the transmitter 21, this second signal being applied to the right hand set of input terminals of the mixer filter 51 through the band pass filter 46b. The mixer 51 heterodynes the two signals applied thereto to reproduce a 315 cycle double heterodyne signal for application through the closed contacts of section 59k of the area selector switch to the right hand set of input terminals of the phase meter 56. To provide a reference signal for phase comparison with this double heterodyne signal the 915 cycle modulation signal appearing on the carrier wave radiated by the transmitter 19 at the unit 11 is reproduced by the receiver 42 and applied through band pass filter 42b to the upper set of input terminals of the mixer filter 48 where it is heterodyned with the 600 cycle modulation signal from transmitter 18 reproduced by receiver 41 and passed by the filter 41c. The 315 cycle difference frequency between these two reference signals is developed by mixer filter 48 and applied through signal connectors 56a and through the closed contacts of section 59i of the area selector switch to the left hand set of input terminals of the phase meter 56. The phase relationship between the 315 cycle double heterodyne signals applied to the opposite sets of input terminals of the phase meter 56 varies as a direct function of the position of the mobile receiving unit 14 relative to two adjacent lines having the transmitting units 10 and 12 as foci and having a spacing which is determined by the difference between the mean or average frequencies of the two sets of signals radiated from the two transmitters 10 and 12. More specifically, along the base line connecting the transmitting units 10 and 12, this spacing is equal to one-half wave length of a signal having a frequency of about 50 kilocycles, a distance of approximately 9,840 feet. Again it will be understood that the accuracy of the medium lane position indication is sufficient to insure identification of the particular narrow lane in which fine indications are being provided by the fine or narrow lane position indicating facilities including the phase meter 54.

In similar manner, the coarse or wide lane position indication provided by the phase meter 58 does not identify the position of the mobile receiving unit 14 along the particular coarse hyperbolic isophase line corresponding to the reading of the indicating element of this phase meter and thus this indication standing alone is ambiguous. For the purpose of resolving this ambiguity, a second coarse or wide lane position indication is provided by the phase meter 57 which functions to measure the phase relationship between the 600 cycle signal appearing at the output of the filter 41c and the 600 cycle signal appearing at the output of the filter 43c. The indication on the phase meter 57 identifies the position of the mobile receiving unit 14 between two adjacent hyperbolic isophase lines having foci at the transmitting units 11 and 13 and having a spacing corresponding to the 600 cycle modulation frequency appearing on the carrier waves radiated by the transmitters 18 and 22. At this particular frequency, the widely spaced isophase lines are separated along the base line connecting the transmitting units 11 and 13 by one-half wave length of a signal having a frequency of 600 cycles which corresponds to a spacing of approximately 820,000 feet. To summarize, during each period when the transmitters 26a and 26b are in operation, the phase meter 54 provides a fine or narrow lane position indication, the phase meter 56 provides a medium lane position indication and the phase meter 57 provides a wide or coarse lane position indication in which all three of these indications relate to sets of differently spaced hyperbolic isophase lines.

At the end of the third transmitting interval, the commutating ring 29 interrupts the operation of the transmitters 26a and 26b with the result that the heterodyne action occurring in the receivers at the transmitting units 11 and 13 and at the mobile receiving unit 14 is halted. Thus the transmitter 22 and the transmitters 18 and 19 cease the radiation of reference signals and the receivers at the mobile receiving unit are rendered incapable of applying input signals to the phase meters 54, 56, and 57 with the result that the indicating elements of all of these meters remain stationary. A short time interval after operation of the transmitters 26a and 26b is terminated, the commutating ring 29 functions to recomplete the circuit for delivering anode current to the tubes of the transmitters 24a and 24b and thus re-initiates operation of this pair of transmitters with the results described above.

From the above explanation, it will be understood that as the three pairs of transmitters at the unit 10 are sequentially rendered operative to effect signal radiation, the three sets of phase meters 53 and 54, 55 and 56 and 57 and 58 are sequentially rendered operative to produce position indications relative to three sets of fine, medium, and coarse intersecting grids of hyperbolic lines. Thus an absolute determination of the position of the mobile receiving unit 14 within the area of effective reception of signals radiated from the four transmitting units 10, 11, 12 and 13 is obtained. In this regard, it is noted that the switching rate of the switching unit 27 is sufficiently high that the phase meters tend to retain their settings during the short intervals when they are inactive, thereby effectively providing continuous position indications. The indications provided by the phase meters 57 and 58 identify the position of the mobile receiving unit within a relatively wide zone, the area of this zone being determined, as previously indicated, by the accuracy of the phase meter indications. The accuracy of these indications is such that the position of the mobile receiving unit 14 may be determined within one medium lane as indicated by the phase meters 55 and 56. The latter indications identify the approximate position of the mobile receiving unit and thus indicate the particular narrow lane relative to which the fine position indications appearing on the phase meters 53 and 54 are related.

When the mobile receiving unit 14 is operated in the area B shown in Fig. 1, the area selector switch 59 of the mobile receiving equipment may be thrown to the position marked B in order to apply the signals developed by the various filters and mixers to different ones of the phase meters. It will be understood that the operation of the transmitting units 10, 11, 12, 13 and 14 under these conditions is exactly as described above. With the 15 sections of the selector switch in the B position and with the transmitters 24a and 24b at the unit 10 in operation, the receiver 41 develops a 250 cycle beat frequency signal between the carrier waves radiated by the transmitters 24a and 18 and applies the same through the band pass filter 41a, through signal connectors 53a and through the closed contacts (B position) of area selector switch 59a to the left hand set of input terminals of the phase meter 53. To provide a reference signal for phase comparison with this heterodyne signal, the receiver 43 reproduces the 250 cycle modulation signal appearing on the carrier wave radiated by the transmitter 22 and applies the same through the band pass filter 43a and through the closed B position contacts of section 59b of the area selector switch to the right hand set of input terminals of the phase meter 53. This phase meter thus provides an indication of the position of the mobile receiving unit relative to two adjacent isophase lines having foci at the transmitting units 10 and 11 and having a spacing corresponding to the mean frequency between the carrier waves radiated by the transmitter 24a and the transmitter 18. Thus, the phase meter 53 again provides an indication of the fine or narrow lane position of the mobile receiving unit 14. The 250 cycle modulation signal passed by the filter 43a is also applied through the closed contacts of section 59e of the area selector switch to the left hand set of signal input terminals of the mixer filter 49 which functions to heterodyne this signal with a 340 cycle modulation signal applied thereto from the filter 44a and derived from the modulation signal appearing on the carrier wave radiated by the transmitter 23 at the unit 13. The mixer filter 49 reproduces the 90 cycle double heterodyne signal between the two modulation components exciting it and applies the same through signal connectors 49a and through closed contacts of section 59d of the area selector switch to the right hand set of input terminals of the phase meter 55. The left hand set of input terminals of this meter again receive the 90 cycle output of the mixer filter 47 derived from heterodyning the 250 cycle beat frequency from receiver 41 and a 340 cycle beat frequency between the carrier waves radiated by transmitters 19 and 24b and developed in the receiver 42. As a result, the phase meter 55 provides an indication of the position of the mobile receiving unit relative to two adjacent isophase lines having foci at the transmitting units 10 and 11 and having a spacing corresponding to the difference in frequency between the pairs of signals radiated by the two transmitters at each of these two units. As previously indicated, this phase meter indication identifies the location of the mobile receiving unit within a medium lane.

During this same interval, the 250 cycle modulation signal appearing on the carrier wave radiated by the transmitter 20 at the unit 12 is reproduced in the receiver 45 for application through the band pass filter 45a and through the closed contacts of section 59p of the area selector switch to the left hand set of input terminals of the phase meter 57. The right hand set of input terminals of this phase meter is energized by the 250 cycle modulation signal passed by the filter 43a and applied to the phase meter 57 from the transmitter 22 which is produced by the receiver 43 and through the closed contacts of section 59r of the area selector switch. The phase meter 57 thus provides a coarse or wide lane position indication which is only roughly indicative of the position of the mobile receiving unit 14 but which, nevertheless, serves to identify the particular medium lane indicated by the medium phase sensitivity indicating facilities including the phase meter 55. To summarize, during the interval when the transmitters 24a and 24b of the unit 10 are in operation and the selector switch 59 is in the B position the phase meters 53, 55 and 57 provide a plurality of indications of the position of the mobile receiving unit relative to sets of hyperbolic lines having widely different spacing.

During the interval when the transmitters 25a and 25b are in operation, the 400 cycle beat frequency signal developed by the receiver 43 as a result of heterodyning the carrier waves radiated by the transmitter 25a and the transmitter 22 at the unit 13 is passed through band pass filter 43b and through closed contacts of section 59g of the area selector switch to the left hand set of input terminals of the phase meter 54. The 400 cycle modulation signal appearing on the carrier wave radiated by the transmitter 18 at the unit 11 is reproduced by the receiver 41 and applied through the band pass filter 41b and through the closed contacts of section 59h of the area selector switch to the right hand set of input terminals of the phase meter 54. This phase meter thus provides a fine or narrow lane position indication of the location of the mobile receiving unit 14 relative to the units 10 and 13 in the manner indicated above. The 400 cycle heterodyne signal passed by the filter 43b is also applied to the upper set of signal input terminals of the mixer filter 52 where it is heterodyned with a 535 cycle signal derived from the receiver 44 which heterodynes the carrier waves radiated by the transmitters 25b and 23. This 535 cycle signal is applied to the right hand set of signal input terminals of the mixer filter 52 through the band pass filter 44b and through signal connectors 52a. The 135 cycle double heterodyne signal appearing across the signal output connectors 52b of the mixer filter 52 is applied through the closed B position contacts of section 59i of the area selector switch to the left hand set of input terminals of the phase meter 56.

The 400 cycle signal passed by the filter 41b is applied through signal connectors 50a and through the closed B position contacts of section 59f of the area selector switch to the right hand set of input terminals of the mixer filter 50. The 535 cycle modulation signal appearing on the carrier wave radiated by the transmitter 21 at the unit 12 is reproduced by the receiver 46 and applied through the band pass filter 46a to the upper set of signal input terminals of the mixer filter 50 where it is heterodyned with the 400 cycle signal from the filter 41b to provide a 135 cycle signal which is applied to the right hand set of input terminals of the phase meter 56 through the closed contacts of section 59k of the area selector switch for phase comparison with the double heterodyne reference signal applied to the left hand set of input terminals of this phase meter. In the manner previously indicated, the phase meter 56 provides a medium lane position indication which serves to identify the particular fine lane indication provided by the narrow lane position indicating facilities including the phase meter 54.

During the interval when the transmitters 26a and 26b at the unit 10 are in operation, the 600 cycle reference signal appearing on the carrier wave radiated by the transmitter 18 is reproduced by the receiver 41 and applied through the band pass filter 41c and through closed contacts of section 59s of the area selector switch to the left hand set of input terminals of the phase meter 58. The 600 cycle signal modulated upon the carrier wave radiated by the transmitter 22 at the unit 13 is reproduced by the receiver 43 and applied through the band pass filter 43c and through closed contacts of section 59m of the area selector switch to the right hand set of input terminals of the phase meter 58. The phase meter 58 thus provides a coarse or wide lane position indication indicative of the position of the mobile receiving unit 14 between two adjacent isophase lines having foci at the transmitting units 11 and 13 and having a spacing corresponding to the 600 cycle modulation signal appearing on the carrier waves radiated by the transmitters 18 and 22 at these units.

Thus it is apparent that when the area selector switch 59 is in the position marked B the pairs of phase meters 53 and 54, 55 and 56 and 57 and 58 are alternately rendered operative to produce position indications relative to three intersecting sets of fine, medium and coarse hyperbolic grid patterns thereby facilitating an absolute determination of the position of the mobile receiving unit 14 within the area B.

When it is desired to operate one of the mobile receiving units 14 in the area C shown in Fig. 1, the switch 59 is placed in the position marked C in order to connect the outputs of the various filters and mixers to preselected ones of the phase meters thereby effecting an absolute position determination in the manner previously described for the conditions when the area selector switch is in either the A or B positions. With the transmitters 24a and 24b at the unit 10 in operation, the receiver 43 again reproduces the 250 cycle modulation signal appearing on the carrier wave radiated by transmitter 22 for application through the band pass filter 43a to the right hand set of input terminals of the phase meter 57. The receiver 45 reproduces the 250 cycle modulation signal appearing on the carrier wave radiated by the transmitter 20 and applies the same through the band pass filter 45a and through the closed contacts of section 59p of the area selector switch to the left hand set of input terminals of the phase meter 57. This phase meter thus provides a coarse or wide lane position indication which identifies the rough position of the mobile receiving unit 14 within the area C.

During the interval when the transmitters 25a and 25b at the unit 10 are in operation, the receiver 43 heterodynes the carrier wave radiated by the transmitter 25a with that radiated by the transmitter 22 at the unit 13 to reproduce a 400 cycle beat frequency signal for application through the band pass filter 43b and through the closed contacts of section 59g of the area selector switch to the left hand set of input terminals of the phase meter 54. The 400 cycle reference signal modulated upon the carrier wave radiated by the transmitter 20 at the unit 12 is reproduced by the receiver 45 and applied through the band pass filter 45b and through closed contacts of section 59h of the area selector switch to the right hand set of input terminals of the phase meter 54. This phase meter thus provides an indication of the fine or narrow lane position of the receiving unit between two adjacent and closely spaced hyperbolic isophase lines having foci at the transmitting units 10 and 13.

During this same interval, the position indicating signals radiated by the transmitter 25b at the unit 10 and the transmitter 23 at the unit 13 are heterodyned by the receiver 44 to reproduce a 535 cycle beat frequency signal for application through the band pass filter 44b to the right hand set of signal input connectors of the mixer filter 52. The 400 cycle signal output of the filter 43b is applied to the upper set of signal input terminals of the mixer filter 52 with the result that this mixer re-produces a 135 cycle double heterodyne signal for application through signal connectors 52b and through the closed C position contacts of section 59i to the left hand set of input terminals of the phase meter 56. The 535 cycle modulation signal appearing on the carrier wave radiated by transmitter 21 and reproduced by receiver 46 is passed by the band pass filter 46a and is heterodyned by mixer filter 50 with the 400 cycle modulation signal output of the filter 45b applied to this mixer through closed contacts of section 59f of the area selector switch. The 135 cycle double heterodyne signal developed by the mixer filter 50 is applied through the closed contacts of section 59k of the area selector switch to the right hand set of input terminals of the phase meter 56. This phase meter thus provides a medium lane indication which serves to identify the particular pair of closely spaced isophase lines to which the indication on the fine or narrow lane indicating facilities including the phase meter 54 is related.

During this same interval, the 400 cycle modulation signal output of the filter 45b is applied through signal connectors 58b and through the closed contacts of section 59m of the area selector switch to the right hand set of input terminals of the phase meter 58. The 400 cycle signal output of the filter 41b is applied through the closed contacts of section 59s of the area selector switch to the left hand set of input terminals of the phase meter 58. This phase meter thus provides a wide or coarse lane position indication representative of the position of the mobile receiving unit 14 between two adjacent isophase lines having foci at the location of the transmitting units 11 and 12 and having a spacing corresponding to the 400 cycle modulation signal appearing on the carrier waves radiated by the transmitters 18 and 20.

During the interval when the transmitters 26a and 26b at the unit 10 are in operation, the receiver 45 functions to develop a 600 cycle heterodyne signal for application through the band pass filter 45c and through the closed contacts of section 59b of the area selector switch to the right hand set of input terminals of the phase meter 53. To provide a reference signal for phase comparison with this 600 cycle heterodyne signal, the receiver 43 reproduces the 600 cycle modulation component appearing on the carrier wave radiated by the transmitter 22 and passes the same through the band pass filter 43c and through the closed contacts of section 59a of the area selector switch to the left hand set of input terminals of the phase meter 53. This phase meter thus provides a fine or narrow lane position indication indicative of the location of the mobile receiving unit 14 between adjacent and closely spaced hyperbolic isophase lines having foci at the transmitting units 10 and 12.

During this same interval of operation, the 600 cycle signal output of the filter 45c is applied to the upper set of input terminals of the mixer filter 51 where it is heterodyned with the 915 cycle heterodyne signal reproduced by the receiver 46 by heterodyning the carrier waves radiated by the transmitter 21 at the unit 12 and the transmitter 26b at the unit 10. The mixer filter 51 produces a 315 cycle double heterodyne signal for application through the closed contacts of section 59d of the area selector switch to the right hand set of input terminals of the phase meter 55. The 600 cycle signal passed by the filter 43c is applied through the closed contacts of section 59n of the area selector switch to the left hand set of signal input terminals of the mixer filter 48. The 915 cycle modulation signal appearing on the carrier wave radiated by the transmitter 19 at the unit 11 is reproduced by the receiver 42 and passed through the band pass filter 42b to the upper set of input terminals of the mixer filter 48. This mixer reproduces the double heterodyne signal of 315 cycles for application through the closed contacts of section 59c of the area selector switch to the left hand set of input terminals of the phase meter 55. This phase meter thus provides a medium lane position indication representative of the position of the mobile receiving unit between two adjacent isophase lines having foci at the transmitting unit 10 and 12 and having a spacing corresponding to the difference in frequency between the pairs of carrier waves radiated by the pair of transmitters at each of these two units.

From the foregoing explanation, it will be apparent that when the area selector switch 59 is in the position marked C the pairs of phase meters 53 and 54, 55 and 56 and 57 and 58 provide position indications relative to three intersecting sets of fine, medium and coarse hyperbolic grid-like patterns thus enabling a complete determination of the location of the mobile receiving unit within the area C shown in Fig. 1.

As previously mentioned, each of the transmitting units 11, 12 and 13 may also be provided with an additional receiver and an associated band pass filter, these receivers and filters being indicated in dotted lines in Figs. 1 and 2 and being respectively designated by the reference characters 11a, 11b, 12a, 12b and 13a, 13b. The receiver 11a functions to heterodyne the carrier wave radiated by the transmitter 23 at the unit 13 with the wave radiated by the transmitter 25b at the unit 10 when the latter is in operation in order to reproduce a 535 cycle beat frequency signal for amplitude modulation upon the carrier wave radiated by the transmitter 19. It will be understood that the 535 cycle signal modulated upon the carrier wave radiated by the transmitter 19 at the unit 11 occurs simultaneously with the modulation of the 535 cycle signal passed by the band pass filter 37a at the unit 12 upon the carrier wave radiated by the transmitter 21. The simultaneous modulation of 535 cycle reference signals upon the carrier waves radiated by the transmitters 19 and 21 provides a means for obtaining an additional coarse position indication at the mobile receiving unit which is indicative of the location of the receiving unt relative to two adjacent hyperbolic isophase lines having foci at the transmitting units 11 and 12 and spaced apart by a distance corresponding to the 535 cycle modulation signal. It will be understood, of course, that in order to provide such a coarse position indication the switching contacts of the area selector switch 59 at the mobile receiving unit 14 will have to be connected to proper ones of the band pass filters associated with the receivers or, alternatively, additional phase indicators and band pass filters may be provided at the mobile receiving unit.

The additional receiver 12a at the unit 12 functions to heterodyne the carrier wave radiated by the transmitter 19 with that radiated by the transmitter 24b at the unit 10 when the latter is in operation in order to develop a 340 cycle beat frequency signal for amplitude modulation upon the carrier wave output of the transmitter 21. In this manner, simultaneous modulation of 340 cycle reference signals upon the carrier waves radiated by the transmitter 21 at the unit 12 and the transmitter 23 at the unit 13 is effected in order to provide signals enabling the production of still another coarse position indication at the mobile receiving unit 14 in the manner indicated above. Similarly the additional receiver 13a at the transmitting unit 13 hererodynes the carrier wave radiated by the transmitter 21 with that radiated by the transmitter 26b at the unit 10 when the latter is in operation in order to develop a 915 cycle beat frequency signal for amplitude modulation upon the carrier wave radiated by the transmitter 23. Thus simultaneous modulation of 915 cycle reference signals upon the carrier waves radiated by the transmitter 23 at the unit 13 and by the transmitter 19 at the unit 11 is effected, thereby providing signals enabling the production of an additional coarse position indication at the mobile receiving unit 14, if desired. In addition to their function in making available additional coarse position indicating signals, the receivers 11a, 12a, and 13a may also be used to eliminate the problem of long distance transmission paths for the 340, 535 and 915 cycle reference signals in certain remote areas where the mobile receiving unit 14 may be stationed. For example, it is apparent that if the mobile receiving unit 14 is operated within the area A in Fig. 1 at a position at some distance below the locations of the units 11 and 12, the 340 cycle modulation signal radiated by the transmitter 23 at the unit 13 must travel over a very long transmission path and, consequently, it is probable that the strength of this signal will be so weak that reliable reception in the remote regions of area A is difficult. Under these conditions the 340 cycle reference signal required to provide the medium lane position indications may be derived from the signal modulated upon the carrier wave radiated by the transmitter 21 and passed by the filter 12b which must travel a considerably shorter distance. In a similar manner, additional 535 cycle and 915 cycle signals are provided by the receivers 11a and 13a, respectively, to permit reliable reception of the required reference signals in remote corners of the areas B and C of Fig. 1.

A further modification of the transmitting facilities of the present improved radio position determining system is illustrated in Fig. 4 wherein there is disclosed a center transmitting unit designated by the reference character 110 and corresponding to transmitting unit 10 of Figs. 1 and 2, together with one of the end transmitting units, the latter being designated by the reference character 113 and corresponding to the transmitting unit 13 in the system shown in Figs. 1 and 2. Specifically, the transmitting unit 110 is identical to the unit 10 shown in Figs. 1 and 2 except for the provision of a linear signal transmission channel comprising the linear mixer 117 and the linear radio frequency amplifier 118 in order to permit the pairs of signals which are adapted to be simultaneously radiated from the transmitting unit 110 to emanate from a single antenna circuit including the antenna 119. It will be understood that the transmitting unit 10 shown in Figs. 1 and 2 requires, as indicated in Fig. 2, a separate antenna for each of the six transmitters and, consequently, the use of the linear signal transmission channel to eliminate all but one of the required antennas provides a distinct advantage. As is fully disclosed in an application Serial No. 425,271 filed April 23, 1954, in the name of William R. Hunsicker entitled Radio Location System and assigned to the same assignee as the present invention, the use of a linear channel including the linear mixer 117 and a linear radio frequency amplifier 118 permits the simultaneous radiation of a plurality of carrier waves from a single transmitting antenna without introducing undesirable intermodulation or side band components. In all other respects, the operation of the transmitting unit 110 is identical to the operation of the unit 10 shown in Figs. 1 and 2, in that, pairs of oscillators 124a and 124b, 125a and 125b and 126a and 126b are sequentially rendered operative by the switch 127 to radiate, during spaced intervals, pairs of carrier waves of different frequency from the single transmitting antenna 119.

The transmitting unit 113 is identical to the unit 13 illustrated in Figs. 1 and 2 except for the fact that the power amplifiers 22c and 23c of the unit 13 have been replaced by a linear signal transmission channel including a linear mixer 140 and a linear radio frequency amplifier 141 in order to permit the simultaneous radiation of two carrier wave signals from a single radiating antenna 142. Since all of the other components of the unit 113 are identical to the corresponding components of the unit 13 previously described they have been assigned the same reference numerals and each functions in exactly the same manner as its corresponding component in the unit 13. It will be understood, of course, that each of the other end transmitting units 11 and 12 of the system shown in Figs. 1 and 2 may be modified to provide a linear signal transmission channel similar to that shown for the transmitting unit 113 in Fig. 4. It will also be understood that the mobile receiving unit 14 shown in Fig. 3 is suitable for use with the transmitting system shown in Fig. 4 and that this receiving unit will provide position indications in exactly the same manner as when used in conjunction with the transmitting system of Figs. 1 and 2.

From the foregoing explanation it will be apparent that the present invention affords a satisfactory solution to the problem of providing complete position determination over a 360° area. Furthermore, it is apparent that the systems described solve this problem by minimizing both the number of channel frequencies and the amount of equipment required to effect the desired result. Moreover, the system has the advantage that well known and standard components may be employed throughout for the transmitting and receiving equipment. Even more important is the fact that while the system is characterized by the precision accuracy inherent in phase comparison systems of position determination, it also embodies the highly desirable feature of non-ambiguity without requiring undue sensitivity of the equipment for providing the position indications.

While particular embodiments of the invention have been shown, it will be understood, of course, that the invention is not limited thereto since many modifications may be made, and it is therefore contemplated by the appended claims to cover any such modifications as fall within the true spirit and scope of the invention.

What is claimed as new and desired to be secured by Letters Patent of the United States is:

1. In a position determining system having a receiving point, at least four spaced transmitting units each of which simultaneously radiates a pair of position indicating signals, means for sequentially and intermittently modulating the pair of signals radiated by at least three of said transmitting units with reference signals, and receiving and translating apparatus at said receiving point jointly responsive to said position indicating and reference signals for producing at least four indications respectively representative of the position of said receiving point relative to different pairs of said transmitting units.

2. In a position determining system having a receiving point, at least three spaced transmitting units each operative to radiate a pair of carrier waves, a fourth transmitting unit spaced from each of said three transmitting units and including means for sequentially radiating at least three pairs of position indicating signals of different frequency, means at least in part responsive to said signals for successively rendering each of said transmitting units alternately operative to transmit position indicating and reference signals, and receiving and translating apparatus at said receiving point jointly responsive to said position indicating and reference signals for producing at least six indications respectively representative of the position of said receiving point relative to different pairs of said transmitting units.

3. In a position determining system having a receiving point, at least three spaced transmitting units continuously operative to radiate pairs of distinguishable position indicating signals, an additional transmitting unit spaced from each of said three transmitting units and including means for radiating another pair of position indicating signals, means at least in part responsive to said last named signals for intermittently and sequentially modulating the pair of signals radiated by each of said transmitters with reference signals, and receiving and translating apparatus at said receiving point jointly responsive to said position indicating and reference signals for producing at least six indications respectively representative of the position of said receiving point relative to different pairs of said transmitting units.

4. In a position determining system having a receiving point, at least three spaced transmitting units each continuously operative to radiate pairs of distinguishable position indicating signals, an additional transmitting unit spaced from each of said three transmitting units and including means for sequentially radiating at least three other pairs of distinguishable position indicating signals, a plurality of heterodyning receivers respectively associated with each of said three transmitting units and each jointly responsive to the position indicating signals radiated by a predetermined one of the signals radiated by another of said three transmitting units and to a different one of the signals radiated by said additional transmitting unit for intermittently and sequentially modulating the pair of signals radiated by said three transmitting units with reference signals, and receiving and translating apparatus at said receiving point jointly responsive to said position indicating and reference signals for producing at least six indications respectively representative of the position of said receiving point relative to different pairs of said transmitting units.

5. A position determining system comprising at least three spaced transmitting units for radiating three pairs of waves of different frequencies to a receiving point, an additional transmitting unit spaced from said three transmitting units and including means for sequentially radiating to said receiving point at least three other pairs of waves at still different frequencies, means selectively responsive to the waves radiated by said additional transmitting unit for sequentially and intermittently modulating the pair of waves radiated by each of said three spaced transmitting units with reference signals, and receiving and translating apparatus at said receiving point jointly responsive to said position indicating and reference signals for producing at least four indications respectively representative of the position of said receiving point relative to different pairs of said transmitting units.

6. A position determining system comprising at least three spaced transmitting units for radiating three pairs of waves of different frequencies to a receiving point, an additional transmitting unit spaced from said three transmitting units and including means for sequentially radiating to said receiving point at least three other pairs of waves at still different frequencies, each of the waves radiated by said additional transmitting unit differing from one of the waves radiated by said three transmitting units by different predetermined difference frequencies, means successively responsive to the pairs of waves radiated by said additional transmitting unit for sequentially and intermittently modulating the pair of waves radiated by each of said three transmitting units with reference signals having frequencies related to said different predetermined difference frequencies, and receiving and translating apparatus at said receiving point jointly responsive to said position indicating and reference signals for producing at least six indications respectively representative of the position of said receiving point relative to different pairs of the transmitting units.

7. In a position determining system having a receiving point, a plurality of spaced transmitting units continuously operative to radiate pairs of distinguishable position indicating signals, additional transmitting apparatus spaced from each of said transmitting units and including means for sequentially radiating in pairs at least six other distinguishable position indicating signals, a pair of heterodyning receivers respectively associated with at least one of said transmitting units and each jointly responsive to predetermined ones of the position indicating signals radiated by the others of said transmitting units and to different ones of the signals radiated by said additional transmitting apparatus for intermittently modulating each of the pair of signals radiated by said one transmitting unit with reference signals of different frequencies, and receiving and translating apparatus at said receiving point jointly responsive to said position indicating and reference signals for producing at least six indications respectively representative of the position of said receiving point relative to different ones of said transmitting units.

8. In a position determining system having a receiving point, at least three spaced transmitting units continuously operative to radiate pairs of distinguishable position indicating signals, additional transmitting apparatus positioned at fixed distances from each of said transmitting units and including means for sequentially radiating in pairs at least six other distinguishable position indicating signals, at least three heterodyning receivers respectively associated with each of said transmitting units and each jointly responsive to the position indicating signal radiated by a predetermined one of the others of said transmitting units and to a different one of the signals radiated by said additional transmitting apparatus for alternately modulating the pair of signals radiated by each of said transmitting units with reference signals having different frequencies respectively equaling the difference frequencies of the heterodyned signals, and receiving and translating apparatus at said receiving point jointly responsive to said position indicating signals and said reference signals for producing at least six indications respectively representative of the position of said receiving point relative to different ones of said transmitting units.

9. In a position indicating system of the type requiring the transmission of signals from both position indicating transmitters which radiate position indicating signals and link transmitters which radiate reference signals, at least three spaced transmitting units for radiating pairs of position indicating signals, additional transmitting apparatus spaced from each of said transmitting units and including means for sequentially radiating three other pairs of position indicating signals, and means selectively responsive to different ones of said other pairs of position indicating signals for sequentially converting said three spaced transmitting units into link transmitting unts.

10. A wave signal transmission system for radiating position indicating signals, comprising at least three spaced transmitting units for radiating pairs of waves at different frequencies, means spaced from said transmitting units for sequentially radiating at least three other pairs of waves at still different frequencies, and means responsive to the pairs of sequentially radiated waves for intermittently modulating each of the pair of waves radiated by each of said transmitting units with reference signals.

11. A wave signal transmission system for radiating position indicating signals, comprising a first pair of spaced transmitting means for radiating two pairs of waves each wave having a different frequency, a second pair of spaced transmitting means for radiating two pairs of waves each having a still different frequency, a third pair of spaced transmitting means for radiating two pairs of waves each having a frequency differing from all of the other waves, means for sequentially rendering one transmitting means of each pair operative to radiate its pair of waves, and means responsive to the pair of waves radiated by said one transmitting means of each pair for alternately modulating each wave of the pair of waves radiated by the other transmitting means of the other pairs with different reference signals having frequencies related to the difference in frequency between the two pairs of waves radiated by the pair of transmitting means of the pair which includes the operating one of said sequentially operated transmitting means.

12. A wave signal transmission system for radiating position indicating waves, comprising at least three spaced transmitting units each radiating a pair of waves and each wave having a different frequency, a fourth transmitting unit spaced from each of said three transmitting units and including means for sequentially radiating in pairs six waves of at least six still different frequencies, and means successively responsive to the pairs of waves radiated by said fourth transmitting unit for alternately modulating the pair of waves radiated by each of said three transmitting units with reference signals.

13. A wave signal transmission system comprising four spaced transmitting units for radiating three groups of waves, each group having four waves and all of said waves having different frequencies, one of said units including means for sequentially radiating two waves of each group, and means responsive to the waves sequentially radiated by said one unit for successively modulating each of the waves radiated by the other units with reference signals having different frequencies respectively related to the difference frequencies between predetermined pairs of the waves of said three groups.

14. A wave signal transmission system comprising four spaced transmitting units for radiating three groups of waves, each group having at least four waves and all of said waves having different frequencies, one of said units including means for sequentially radiating two waves of each group, and means associated with each of the other units and responsive only to the two waves radiated by said one unit for intermittently modulating in succession each of the waves radiated by the other three units with different reference signals having frequencies related to the difference frequencies between the frequency of each of the waves radiated by said one unit and the frequency of a predetermined one of the waves radiated by said other units.

15. A wave signal transmission system comprising four separate transmitting units for radiating three groups of waves, each group including four waves and all of said waves having different frequencies, one of said units including means for sequentially radiating three pairs of waves, each pair constituting two waves of different ones of said groups, means including at least three receivers associated with each of the other three units and each selectively responsive only to one of the waves radiated by said one unit for heterodyning said one wave with a predetermined one of the waves radiated by the other two of said three units and for reproducing, at least three heterodyne signals at each unit, and means for alternately modulating two of said heterodyne signals upon a first of the waves radiated by each of said three units and for intermittently modulating a third difference frequency produced at each unit upon the second of the pair of radiated waves.

16. A wave signal transmission system for radiating position indicating waves, comprising at least three spaced transmitting units each radiating a pair of waves at different frequencies, a fourth transmitting unit spaced from each of said three transmitting units and including means for sequentially radiating three pairs of waves of at least six still different frequencies during three spaced intervals, means for modulating a first wave of each of the pairs of waves radiated by the first and second of said transmitting units with first reference signals during the first of said intervals, means for modulating the other wave radiated by said first transmitting unit by a second reference signal during said first interval, means for modulating the other wave radiated by said second unit with a third reference signal during a second of said intervals, means for modulating the first wave of the pairs of waves radiated by said second and third units with fourth reference signals during said second interval, means for modulating the first wave of the pairs of waves radiated by said first and third units with fifth reference signals during a third of said intervals, and means for modulating the other wave of the pair radiated by said third unit with a sixth reference signal during said third interval.

17. A wave signal transmission system for radiating position indicating waves, comprising at least two spaced transmitting units each radiating a pair of waves at different frequencies, an additional transmitting unit spaced from each of said two transmitting units and including means for sequentially radiating pairs of waves of still different frequencies during spaced intervals, means associated with each of said two transmitting units and responsive only to one of the waves radiated by said additional transmitting unit during the first of said intervals for modulating a first wave of the pairs of waves radiated by said two transmitting units with first reference signals, means responsive to another of the waves radiated by said additional transmitting unit for modulating the second wave of the pair of waves radiated by the first of said two transmitting units with a second reference signal during a second interval, and means for modulating the second of the pair of waves radiated by said second unit with a third reference signal during one of said intervals.

18. In a position determining system, at least three spaced transmitting units for radiating three pairs of waves of different frequencies to a receiving point, an additional transmitting unit spaced from said three transmitting units and including means for sequentially radiating to said receiving point at least three other pairs of waves at still different frequencies, one of the waves of the first pair radiated by said additional transmitting unit differing from one of the waves radiated by a first of said three transmitting units by a first predetermined difference frequency, the other wave of the first pair radiated by said additional transmitting unit differing from the second wave radiated by said first unit by a second predetermined difference frequency, one of the waves of the second pair radiated by said additional transmitting unit differing from one of the waves radiated by a second of said three transmitting units by a third predetermined difference frequency, the other wave of the second pair radiated by said additional transmitting unit differing from the second wave radiated by said second unit by a fourth predetermined difference frequency, one of the waves of the third pair radiated by said additional transmitting unit differing from one of the waves radiated by the third of said transmitting units by a fifth predetermined difference frequency, the other wave of the third pair radiated by said additional transmitting unit differing from the second wave radiated by said third unit by a sixth predetermined difference frequency, means successively responsive to the pairs of waves radiated by said additional transmitting unit for alternately modulating one of the waves radiated by said first transmitting unit with reference signals having first a frequency related to said third predetermined difference frequency and next a frequency related to said fifth predetermined difference frequency and for intermittently modulating the second wave radiated by said first unit with a reference signal having a frequency related to said sixth difference frequency, means responsive to the pairs of waves radiated by said additional transmitting unit for modulating one of the waves radiated by said second transmitting unit with reference signals having first a frequency related to said first difference frequency and next a frequency related to said fifth predetermined difference frequency and for intermittently modulating the second wave radiated by said second transmitting unit with a reference signal having a frequency related to said second predetermined difference frequency, and means at least partly responsive to the pairs of waves radiated by said additional transmitting unit for alternately modulating one of the waves radiated by said third transmitting unit with reference signals having first a frequency related to said first predetermined difference frequency and next a frequency related to said third predetermined difference frequency and for intermittently modulating the second wave radiated by said third transmitting unit with a reference signal having a frequency related to said fourth predetermined difference frequency.

19. A wave signal transmission system for radiating position indicating waves, comprising at least three spaced transmitting units each radiating a pair of waves at different frequencies, an additional transmitting unit spaced from each of said transmitters and including means for sequentially radiating three pairs of waves of at least six still different frequencies during three spaced intervals, means including a receiver associated with each of the first and second of said three transmitting units responsive only to one of the first pair of waves radiated by said additional transmitting unit during a first of said intervals for heterodyning said one wave with a first of the pair of waves radiated by a third of said three transmitting units and for modulating a first of the pair of waves radiated by each of the first and second transmitting units with the difference frequency signal during said first interval, means including a receiver associated with each of said first and third transmitting units for heterodyning one of the waves of the second pair of waves radiated by said additional transmitting unit with the first wave of the pair radiated by the second transmitting unit during the second interval and for modulating the difference frequency upon the first wave of each pair radiated by said first and third units, means including a receiver associated with said second and third units for heterodyning the first wave of the third pair radiated by said additional unit with the first wave of the pair radiated by said first unit and for modulating the difference frequency upon the first wave of each pair radiated by said second and third units during the third interval, and means including an additional receiver associated with each of said three units and each responsive to the second wave of a different one of the three pairs radiated by said additional unit for modulating different reference signals upon the second wave of the pair of waves radiated by each of said units.

20. A wave signal transmission system for radiating position indicating waves, comprising at least three spaced transmitting units each radiating a pair of waves at different frequencies, an additional transmitting unit spaced from each of said transmitters and including means for sequentially radiating three pairs of waves of at least six still different frequencies during three spaced intervals, means including a receiver associated with each of the first and second of said three transmitting units responsive only to one of the first pair of waves radiated by said additional transmitting unit during a first of said intervals for heterodyning said one wave with a first of the pair of waves radiated by a third of said three transmitting units and for modulating a first of the pair of waves radiated by each of the first and second transmitting units with the difference frequency signal during said first interval, means including a receiver associated with each of said first and third transmitting units for heterodyning one of the waves of the second pair of waves radiated by said additional transmitting unit with the first wave of the pair radiated by the second transmitting unit during the second interval and for modulating the difference frequency upon the first wave of each pair radiated by said first and third units, means including a receiver associated with said second and third units for heterodyning the first wave of the third pair radiated by said additional unit with the first wave of the pair radiated by said first unit and for modulating the difference frequency upon the first wave of each pair radiated by said second and third units during the third interval, means including a receiver associated with the second of said units for heterodyning the second wave of the first pair radiated by said additional unit with the second wave of the pair radiated by said third unit and for modulating the difference frequency upon the second wave of the pair radiated by said second unit during the first interval, means including a receiver associated with the first of said units for heterodyning the second wave of the second pair radiated by said additional unit with the second wave of the pair radiated by said second unit and for modulating the difference frequency upon the second wave of the pair radiated by said first unit during the second interval, and means including a receiver associated with the third of said units for heterodyning the second wave of the third pair radiated by said additional unit with the second wave of the pair radiated by said first unit and for modulating the difference frequency upon the second wave of the pair radiated by said third unit during the third interval.

21. In a wave signal transmission system for radiating position indicating signals, at least four spaced transmitting units for radiating twelve position indicating signals at different frequencies, means for sequentially rendering said transmitting units operative in pairs simultaneously to radiate four position indicating signals during a first of three time intervals, to radiate at least one wave modulated with a reference signal during a second interval, and to radiate at least two waves each modulated with reference signals of different frequency during a third interval.

22. A wave signal transmission system for radiating position indicating signals to at least three contiguous areas, comprising at least four spaced transmitting units positioned in a star arrangement and radiating a plurality of position indicating signals at different frequencies, means for sequentially rendering said transmitting units operative in pairs to radiate simultaneously four position indicating signals of different frequencies for reception within a first and second of said areas during a first interval, to simultaneously radiate at least four position indicating signals at still different frequencies to the second and third of said areas during a second interval, and to simultaneously radiate at least four position indicating signals at even different frequencies to the first and third of said areas during a third interval.

23. In a wave signal transmission system, at least four spaced transmitting units for radiating pairs of position indicating signals at different frequencies, means for sequentially rendering said transmitting units operative in pairs simultaneously to radiate at least four high phase sensitivity position indicating signals of different frequency during spaced intervals, and means for simultaneously modulating one wave of each pair radiated by two of said transmitting units with phase synchronized reference signals of identical frequency during other spaced intervals to provide low phase sensitivity signals.

24. In a wave signal transmission system for radiating position indicating waves, at least three spaced transmitting units each radiating a pair of waves and all of said waves having a different frequency, means for rendering each of said transmitting units successively operative to radiate a pair of high phase sensitivity position indicating signals during a first interval, means for modulating each of the pair of waves radiated by each unit with reference signals of different frequency during a second interval, and means for modulating at least one of the waves radiated by each unit with a reference signal of still different frequency during a third interval.

25. In a wave signal transmission system for radiating position indicating signals, at least three spaced transmitting units each radiating a pair of waves, all of said waves having a different frequency, means for sequentially radiating during spaced intervals at least three other pairs of waves all having still different frequencies, and means responsive to the sequentially radiated pairs of waves for intermittently modulating one wave of the pair of waves radiated by at least two of said spaced transmitting units with the same reference signal and for modulating at least one of the other waves of each pair radiated by said two units with a reference signal of different frequency during the period when said one wave is modulated with said same reference signal.

26. In a wave signal transmission system for radiating position indicating signals, at least three spaced transmitting units each radiating a pair of waves, all of said waves having a different frequency, a transmitting means spaced from each of said three transmitting units and including means for sequentially radiating in pairs waves of at least six still different frequencies, and means responsive to the pairs of waves sequentially radiated by said transmitting means for simultaneously modulating one wave of the pair of waves radiated by two of said transmitting units with reference signals of the same frequency and, at the same time, modulating the other wave of the pair radiated by one of said two units with a reference signal of different frequency.

27. Wave signal receiving apparatus for translating pairs of received space radiated waves into six position indications, comprising a plurality of receivers for receiving the space radiated waves, means for selectively rendering said receivers sequentially operative in pairs to heterodyne different pairs of space radiated waves thereby producing a different beat frequency signal from each of said receivers, to receive and reproduce at least two pairs of modulation signals modulated upon said space radiated waves during spaced intervals, the signals of each pair having the same frequency, and to receive and reproduce reference signals of different frequency during different spaced intervals, and phase measuring means for measuring the phase relationship between one of said beat frequency signals and one of said reference signals to provide a first high phase sensitivity position indication, for measuring the phase relationship between the other of said beat frequency signals and a second of said reference signals to provide a second high phase sensitivity position indication, and for measuring the phase relationship between the signals of the pairs of modulation signals to provide at least two coarse phase sensitivity position indications, means for heterodyning said beat frequency signals in pairs to provide at least two double heterodyne position indicating signals, means for heterodyning said reference signals in pairs to provide at least two double heterodyne reference signals, means for measuring the phase relationship between one of said double heterodyning position indicating signals and one of said double heterodyne reference signals to provide a medium phase sensitivity position indication, and means for measuring the phase relationship between the second of said double heterodyne position indicating signals and the second of said double heterodyne reference signals to provide a second medium phase sensitivity position indication.

28. Wave signal receiving apparatus for translating pairs of received space radiated waves into six position indications, comprising a plurality of receivers for receiving space radiated waves, means for sequentially rendering each of said receivers operative during different intervals to heterodyne a different pair of said space radiated waves to produce different heterodyne signals, a different pair of said receivers functioning simultaneously as heterodyning receivers during each of three spaced intervals in order to produce at least two heterodyne signals during each interval, means for rendering at least two of said receivers operative to receive and reproduce a first pair of modulation signals of the same frequency during a first interval and for rendering another of said receivers operative to receive and reproduce a first reference signal during said first interval, means for heterodyning the two heterodyne signals produced during said first interval to provide a first difference frequency signal, means for heterodyning one of said modulation signals produced during said first interval with said first reference signal to provide a second difference frequency signal, phase measuring means for measuring the phase relationship between one of said heterodyne signals and said first reference signal, for measuring the phase relationship between said first and second difference frequency signals, and for measuring the phase relationship between said first pair of modulation signals, means for rendering at least two of said receivers operative during one of the other two of said intervals to receive and reproduce a second pair of modulation signals of identical frequency, means for measuring the phase relationship between each signal of said second pair of modulation signals, means for rendering one of said receivers operative during one of said other two intervals to receive and reproduce a second reference signal and for rendering a different one of said receivers operative to receive and reproduce a third reference signal, means for heterodyning said second and third reference signals to produce a third difference frequency signal, means for heterodyning the two heterodyne signals produced during the same interval as said second and third reference signals to produce a fourth difference frequency signal, means for measuring the phase relationship between one of the last mentioned heterodyne signals and said second reference signal, and phase measuring means for measuring the phase relationship between said third and fourth difference frequency signals.

References Cited in the file of this patent

UNITED STATES PATENTS 2,513,317     Hawkins et al. _____ July 4, 1950